(12) United States Patent  
Cammenga et al.

(10) Patent No.: US 8,643,931 B2  
(45) Date of Patent: Feb. 4, 2014

(54) VEHICLE REARVIEW MIRROR WITH SPOTTER MIRROR

(75) Inventors: David J. Cammenga, Zeeland, MI (US); Brian J. Steenwyk, Holland, MI (US); Michael L. McLarty, Holland, MI (US); Randall S. Braun, Hudsonville, MI (US)

(73) Assignee: Gentex Corporation, Zeeland, MI (US)

( * ) Notice: Subject to any disclaimer, the term of this patent is extended or adjusted under 35 U.S.C. 154(b) by 322 days.

(21) Appl. No.: 13/171,950

(22) Filed: Jun. 29, 2011

(65) Prior Publication Data

US 2011/0317241 A1 Dec. 29, 2011

Related U.S. Application Data

(63) Continuation-in-part of application No. 12/984,187, filed on Jan. 4, 2011, now Pat. No. 8,264,761, which is a continuation of application No. 12/488,947, filed on Jun. 22, 2009, now Pat. No. 7,864,400.

(51) Int. Cl.
| | |
|---|---|
| *G02F 1/155* | (2006.01) |
| *G02F 1/15* | (2006.01) |
| *G02B 5/10* | (2006.01) |
| *G09G 3/19* | (2006.01) |
| *H04N 9/16* | (2006.01) |

(52) U.S. Cl.
USPC ............. 359/266; 359/265; 359/868; 345/49; 348/817

(58) Field of Classification Search
USPC ......... 359/265–275, 277, 245–247, 254, 242; 345/49, 105; 250/70; 348/814, 817; 439/929; 349/182–186
See application file for complete search history.

(56) References Cited

U.S. PATENT DOCUMENTS

| 3,267,806 A | 8/1966 | Azegami |
| 4,325,609 A | 4/1982 | Alford |
| 4,674,850 A | 6/1987 | Blom |
| 4,989,964 A | 2/1991 | Meise |
| 5,005,962 A | 4/1991 | Edelman |
| 5,166,833 A | 11/1992 | Shyu |
| 6,032,323 A | 3/2000 | Smith et al. |

(Continued)

FOREIGN PATENT DOCUMENTS

| DE | 3606020 A1 | 8/1897 |
| DE | 2915521 A1 | 10/1980 |

(Continued)

*Primary Examiner* — Dwayne A Pinkney  
(74) *Attorney, Agent, or Firm* — Price Heneveld LLP; Scott P. Ryan

(57) ABSTRACT

An exterior rearview mirror element including a front element having a first front surface and a second rear surface. A cross-section of the second rear surface defines a first line. A rear element includes a third front surface and a fourth rear surface. Electrochromic material is located between the front element and the rear element. A spotter optic is located in the second rear surface of the front element. A cross-section of the spotter optic defines a second line. A transition region is disposed between the spotter optic and the second rear surface of the front element. A distance from a surface of the transition region to an intersection of the first line and the second line is between about 0.001 mm and 0.034 mm. At least a portion of the spotter optic includes a first radius of curvature and at least a portion of the first front surface includes a second radius of curvature, the first radius of curvature being smaller than the second radius of curvature.

17 Claims, 13 Drawing Sheets

(56) References Cited

U.S. PATENT DOCUMENTS

| | | |
|---|---|---|
| 6,315,419 B1 | 11/2001 | Platzer, Jr. |
| 7,064,882 B2 | 6/2006 | Tonar et al. |
| 7,097,312 B2 | 8/2006 | Platzer, Jr. |
| 7,324,261 B2 | 1/2008 | Tonar et al. |
| 7,349,143 B2 | 3/2008 | Tonar et al. |
| 7,372,611 B2 | 5/2008 | Tonar et al. |
| 7,379,225 B2 | 5/2008 | Tonar et al. |
| 7,477,439 B2 | 1/2009 | Tonar et al. |
| 7,511,872 B2 | 3/2009 | Tonar et al. |
| 7,570,413 B2 | 8/2009 | Tonar et al. |
| 7,602,542 B2 | 10/2009 | Tonar et al. |
| 7,612,929 B2 | 11/2009 | Tonar et al. |
| 7,688,495 B2 | 3/2010 | Tonar et al. |
| 7,719,750 B2 | 5/2010 | Tonar et al. |
| 7,746,534 B2 | 6/2010 | Tonar et al. |
| 7,748,856 B2 | 7/2010 | Zhao |
| 7,830,583 B2 | 11/2010 | Neuman et al. |
| 7,864,398 B2 | 1/2011 | Dozeman et al. |
| 7,864,400 B1 | 1/2011 | Cammenga et al. |
| 7,887,204 B2 | 2/2011 | Zhao |
| 7,978,393 B2 | 7/2011 | Tonar et al. |
| 8,004,741 B2 | 8/2011 | Tonar et al. |
| 8,021,005 B2 | 9/2011 | Zhao |
| 2008/0304170 A1* | 12/2008 | Zhao ............................ 359/864 |
| 2009/0207513 A1 | 8/2009 | Luten et al. |
| 2010/0039691 A1 | 2/2010 | Thomas et al. |
| 2010/0215903 A1 | 8/2010 | Tonar et al. |
| 2010/0220407 A1 | 9/2010 | Zhao |
| 2010/0246017 A1 | 9/2010 | Tonar et al. |
| 2010/0321758 A1 | 12/2010 | Bugno et al. |
| 2011/0002028 A1 | 1/2011 | Luten et al. |
| 2011/0080629 A1 | 4/2011 | Neuman et al. |
| 2011/0205614 A1 | 8/2011 | Zhao |
| 2013/0083388 A1* | 4/2013 | Rawlings ...................... 359/267 |

FOREIGN PATENT DOCUMENTS

| | | |
|---|---|---|
| DE | 3624321 A1 | 2/1988 |
| DE | 3743072 A1 | 7/1989 |
| JP | 55076721 A | 6/1980 |
| JP | 491539 U | 8/1992 |
| JP | 10086899 A | 4/1998 |

* cited by examiner

VEHICLE REARVIEW MIRROR WITH SPOTTER MIRROR

CROSS-REFERENCE TO RELATED APPLICATIONS

This application is a continuation-in-part of U.S. patent application Ser. No. 12/984,187 (now U.S. Pat. No. 8,264,761), entitled VEHICLE REARVIEW MIRROR WITH SPOTTER MIRROR, by David J. Cammenga et al., filed on Jan. 4, 2011, which is a continuation of U.S. patent application Ser. No. 12/488,947 (now U.S. Pat. No. 7,864,4001, entitled VEHICLE REARVIEW MIRROR WITH SPOTTER MIRROR, by David J. Cammenga et al., filed on Jun. 22, 2009, the disclosures of which are hereby incorporated by reference in their entirety.

FIELD OF THE INVENTION

The present invention concerns vehicle mirrors, and more particularly relates to rearview mirrors having a spotter mirror.

BACKGROUND OF THE INVENTION

Electrochromic elements are used in a variety of applications including light shutters, variable attenuating optical filters, and architectural and vehicle windows. The most common application of electrochromic elements is in rearview mirror assemblies used in vehicles. Such electrochromic rearview mirrors are controlled to vary the reflectivity of the mirror in response to rearward and forward aimed light sensors so as to reduce the glare of headlamps in the image reflected to the driver's eyes.

SUMMARY OF THE PRESENT INVENTION

An aspect of the present invention is to provide an exterior rearview mirror element including a front element having a first front surface and a second rear surface. A cross-section of the second rear surface defines a first line. A rear element includes a third front surface and a fourth rear surface. Electrochromic material is located between the front element and the rear element. A spotter optic is located in the second rear surface of the front element. A cross-section of the spotter optic defines a second line. A transition region is disposed between the spotter optic and the second rear surface of the front element. A distance from a surface of the transition region to an intersection of the first line and the second line is between about 0.001 mm and 0.034 mm. At least a portion of the spotter optic includes a first radius of curvature and at least a portion of the first front surface includes a second radius of curvature, the first radius of curvature being smaller than the second radius of curvature.

Another aspect of the present invention is to provide an exterior rearview mirror element including a front element having a first front surface and a second rear surface. A rear element includes a third front surface and a fourth rear surface. Electrochromic material is located between the front element and the rear element. A spotter optic is located at the second rear surface of the front element. The spotter optic includes a reflective coating. At least a portion of the spotter optic includes a first radius of curvature and at least a portion of the first front surface includes a second radius of curvature, the first radius of curvature being smaller than the second radius of curvature. An electrical potential is applied across a first electrode coating on the second rear surface and a second electrode coating on the third front surface, changing an absorption of the electrochromic material in order to reduce a reflection off of the exterior rearview mirror element. A transition region is located between the second rear surface of the front element and the spotter optic. A cross-section of the second rear surface defines a first line, and a cross-section of the spotter optic defines a second line. A distance from the transition region to the intersection of the first line and the second line is between about 0.004 mm and 0.020 mm.

Yet another aspect of the present invention is to provide an exterior rearview mirror element including a front element having a first front surface and a second rear surface. The second rear surface includes a first electrode coating thereon. A rear element includes a third front surface and a fourth rear surface. The third front surface includes a second electrode coating thereon. Electrochromic material is located between the front element and the rear element. A spotter optic is located at the second rear surface of the front element. The spotter optic includes a reflective coating. A transition region is disposed between the spotter optic and the second rear surface. The transition region defines a first area and the spotter optic defines a second area. The first area is less than 20 percent of the second area. The first electrode coating and the reflective coating abut and overlap such that a line perpendicular to the first front surface of the front element extends through both the first electrode coating and the reflective coating.

These and other aspects, objects, and features of the present invention will be understood and appreciated by those skilled in the art upon studying the following specification, claims, and appended drawings.

DETAILED DESCRIPTION OF PREFERRED EMBODIMENTS

Figure 1:
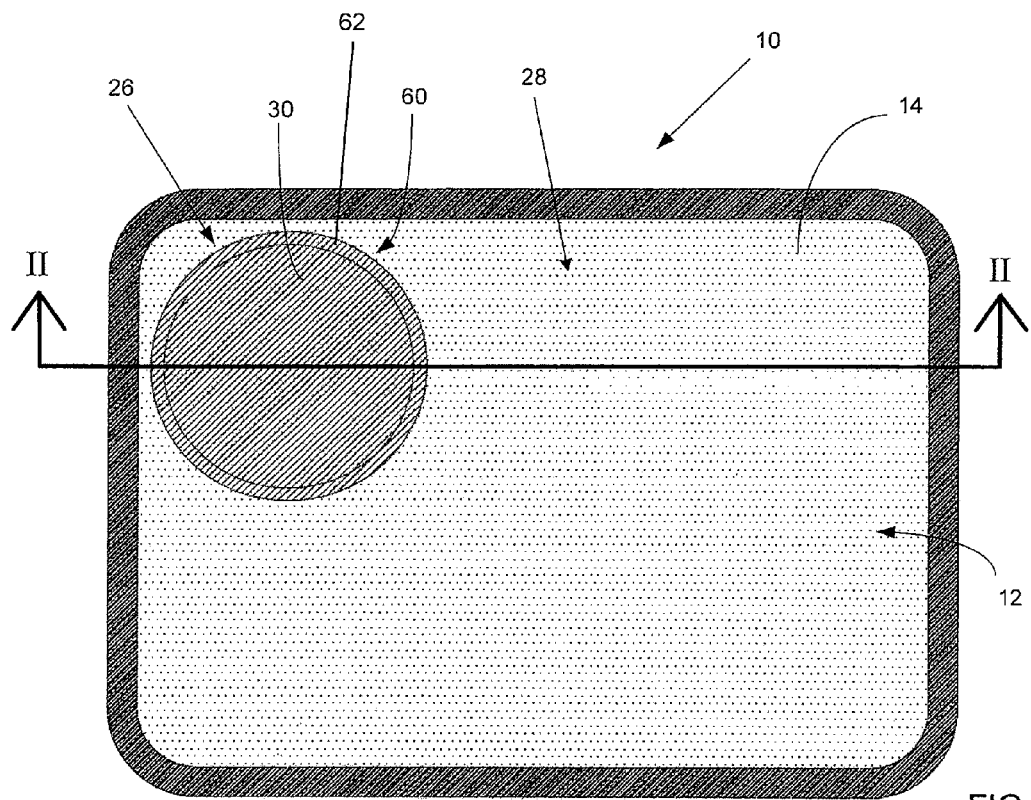
FIG. 1 is a front view of a first embodiment of an exterior rearview mirror element embodying the present invention.

For purposes of description herein, the terms "upper," "lower," "right," "left," "rear," "front," "vertical," "horizontal," and derivatives thereof shall relate to the invention as orientated in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The reference number 10 (FIGS. 1-3) generally designates an exterior rearview mirror element embodying the present invention. In the illustrated example, the exterior rearview mirror element 10 comprises a front element 12 having a first front surface 14 and a second rear surface 16 and a rear element 18 having a third front surface 20 and a fourth rear surface 22. The exterior rearview mirror element 10 further includes electrochromic material 24 located between the front element 12 and the rear element 18. The exterior rearview mirror element 10 also includes a spotter optic 26 in contact with the electrochromic material 24. The rearview mirror element 10 has a first area 28 not including the spotter optic 26 and a second area 30 including the spotter optic 26. The first area 28 reflects a first zone 32 and the second area 30 reflects a second zone 34, with the second zone 34 being different than the first zone 32. The exterior rearview mirror element 10 provides a driver of a vehicle with two images, with one image providing an area of view different than the area of view of the other image.

The illustrated exterior rearview mirror element 10 (FIGS. 1-2) includes the front element 12 and the rear element 18, with a layer of electrochromic (EC) material 24 therebetween. A top electrical conductor 40 and a bottom electrical conductor 42 are in electrical contact with opposing sides of the EC material 24 and are operably connected to a control circuit on a circuit board as is well known to those skilled in the art.

Figure 2:
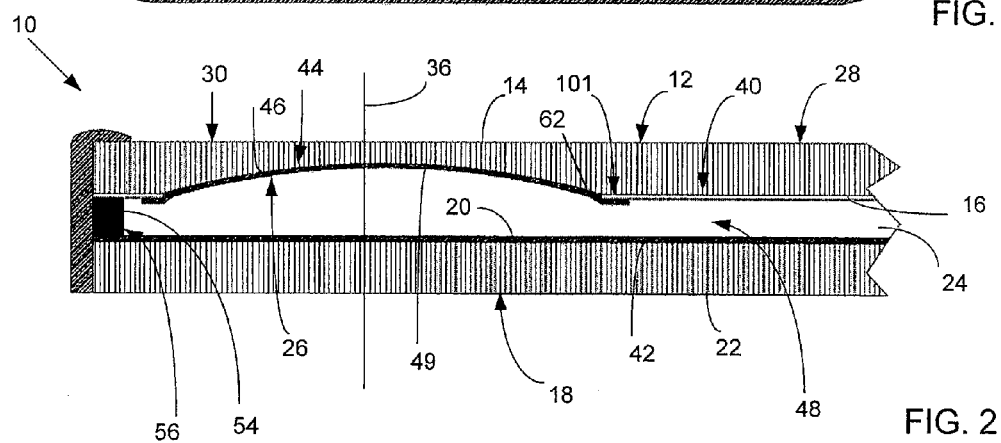
FIG. 2 is a cross-section view of the first embodiment of the exterior rearview mirror element embodying the present invention taken along the line II-II of FIG. 1.

FIGS. 1 and 2 illustrate the exterior rearview mirror element 10 constructed in accordance with a first embodiment of the present invention. A chamber 48 is defined by the top electrical conductor 40 (carried on the second rear surface 16), the bottom electrical conductor 42 (disposed on the third front surface 20), and an inner circumferential wall 54 of a sealing member 56. The EC medium 24 is contained within the chamber 48. As broadly used and described herein, the reference to an electrode, conductor or layer as being "carried" on a surface of an element refers to both electrodes or layers that are disposed directly on the surface of an element or disposed on another coating, layer or layers that are disposed directly on the surface of the element.

In the illustrated example, the front element 12 may be any material which is transparent and has sufficient strength to be able to operate in the conditions (e.g., varying temperatures and pressures) commonly found in the automotive environment. The front element 12 may comprise any type of borosilicate glass, soda lime glass, float glass, or any other material, such as, for example, a polymer or plastic, that is transparent in the visible region of the electromagnetic spectrum. The front element 12 is preferably a sheet of glass. The rear element 18 must meet the operational conditions outlined above, except that it does not need to be transparent in all applications, and therefore may comprise polymers, metals, glass, ceramics, and preferably is a sheet of glass. It is contemplated that the first front surface 14 of the front element 12 could include an anti-reflective coating thereon (over the entire surface or just a portion thereof (e.g., over the spotter optic 26)).

The bottom electrical conductor 42 on the third front surface 20 is sealably bonded to the top electrical conductor 40 on the rear second surface 16 in a spaced-apart and parallel relationship by the sealing member 56 disposed near an outer perimeter of both the second rear surface 16 and the third front surface 20. The sealing member 56 may be any material that is capable of adhesively bonding the coatings on the second rear surface 16 to the coatings on the third front surface 20 to seal the perimeter such that electrochromic material 24 does not leak from chamber 48. As described below, the top electrical conductor 40 and/or the bottom electrical conductor 42 may be removed over a portion where the sealing member 56 is disposed. In such a case, the sealing member 56 should bond well to glass.

The performance requirements for the sealing member 56 used in an electrochromic device are similar to those for a perimeter seal used in a liquid crystal device (LCD), which are well known in the art. The seal must have good adhesion to glass, metals and metal oxides; must have low permeabilities for oxygen, moisture vapor, and other detrimental vapors and gases; and must not interact with or poison the electrochromic or liquid crystal material it is meant to contain and protect. The perimeter seal can be applied by means commonly used in the LCD industry, such as by silk-screening or dispensing. Because of their lower processing temperatures, thermoplastic, thermosetting or UV curing organic sealing resins are preferred. Such organic resin sealing systems for LCDs are described in U.S. Pat. Nos. 4,297,401, 4,418,102, 4,695,490, 5,596,023, and 5,596,024. Because of their excellent adhesion to glass, low oxygen permeability and good solvent resistance, epoxy-based organic sealing resins are preferred. These epoxy resin seals may be UV curing, such as described in U.S. Pat. No. 4,297,401, or thermally curing, such as with mixtures of liquid epoxy resin with liquid polyamide resin or dicyandiamide, or they can be homopolymerized. The epoxy resin may contain fillers or thickeners to reduce flow and shrinkage such as fumed silica, silica, mica, clay, calcium carbonate, alumina, etc., and/or pigments to add color. Fillers pretreated with hydrophobic or silane surface treatments are preferred. Cured resin crosslink density can be controlled by use of mixtures of mono-functional, di-functional, and multi-functional epoxy resins and curing agents. Additives such as silanes, titanates, or sulfur or phosphorous compounds can be used to improve the seal's hydrolytic stability and adhesion, and spacers such as glass or plastic beads or rods can be used to control final seal thickness and substrate spacing. Suitable epoxy resins for use in the sealing member 56 include, but are not limited to: "EPON RESIN" 813, 825, 826, 828, 830, 834, 862, 1001F, 1002F, 2012, DPS-155, 164, 1031, 1074, 58005, 58006, 58034, 58901, 871, 872, and DPL-862 available from Shell Chemical Co., Houston, Tex.; "ARALITE" GY 6010, GY 6020, CY 9579, GT 7071, XU 248, EPN 1139, EPN 1138, PY 307, ECN 1235, ECN 1273, ECN 1280, MT 0163, MY 720, MY 0500, MY 0510, and PT 810 available from Ciba Geigy, Hawthorne, N.Y.; and "D.E.R." 331, 317, 361, 383, 661, 662, 667, 732, 736, "D.E.N." 354, 354LV, 431, 438, 439 and 444 available from Dow Chemical Co., Midland, Mich. Suitable epoxy curing agents include V-15, V-25, and V-40 polyamides from Shell Chemical Co.; "AJICURE" PN-23, PN-34, and VDH available from Ajinomoto Co., Tokyo, Japan; "CUREZOL" AMZ, 2MZ, 2E4MZ, C11Z, C17Z, 2PZ, 2IZ, and 2P4MZ available from Shikoku Fine Chemicals, Tokyo, Japan; "ERI-SYS" DDA or DDA accelerated with U-405, 24EMI, U-410, and U-415 available from CVC Specialty Chemicals, Maple Shade, N.J.; and "AMICURE" PACM, 2049, 352, CG, CG-325, and CG-1200 available from Air Products, Allentown, Pa. Suitable fillers include fumed silica such as "CAB-O-SIL" L-90, LM-130, LM-5, PTG, M-5, MS-7, MS-55, TS-720, HS-5, and EH-5 available from Cabot Corporation, Tuscola, Ill.; "AEROSIL" R972, R974, R805, R812, R812 S, R202, US204, and US206 available from Degussa, Akron, Ohio. Suitable clay fillers include BUCA, CATALPO, ASP NC, SATINTONE 5, SATINTONE SP-33, TRANSLINK 37, TRANSLINK 77, TRANSLINK 445, and TRANSLINK 555 available from Engelhard Corporation, Edison, N.J. Suitable silica fillers are SILCRON G-130, G-300, G-100-T, and G-100 available from SCM Chemicals, Baltimore, Md. Suitable silane coupling agents to improve the seal's hydrolytic stability are Z-6020, Z-6030, Z-6032, Z-6040, Z-6075, and Z-6076 available from Dow Corning Corporation, Midland, Mich. Suitable precision glass microbead spacers are available in an assortment of sizes from Duke Scientific, Palo Alto, Calif. The seal may be constructed in accordance with the teachings in U.S. Pat. Nos. 5,790,298 and 6,157,480, the entire disclosures of which are incorporated herein by reference.

Another suitable way to maintain precision spacing between the front element 12 and the rear element 18 is by adding plastic fibers to the sealing material 56. These fibers, if cut from monofilament in an aspect ratio of about 2.5 to 3 to 1 (length to diameter), are particularly effective in keeping the front element 12 and the rear element 18 from sliding during the seal cure process. The glass spheres act as ball bearings that can enable movement between the front element 12 and the rear element 18 during seal cure. Plastic fibers made of high temperature polyester (PEN) or polyetherimide (Ultem) when added to the sealing material 56 at around a 1% by weight loading help prevent movement of the front element 12 and the rear element 18 because they are randomly orientated and some will not be positioned to roll. These plastic spacers have another benefit in that they more closely match the thermal expansion of cured organic sealing material and consequently will generate less seal stress during thermal cycling.

The top electrical conductor 40 is deposited on the second rear surface 16 to act as an electrode. The top electrical conductor 40 is transparent and may be any material which bonds well to the front element 12, is resistant to corrosion to any materials within the exterior rearview mirror element 10, is resistant to corrosion by the atmosphere or road salts, has minimal diffuse or specular reflectance, high light transmission, near neutral coloration, and good electrical conductance. The top electrical conductor 40 may be fluorine-doped tin oxide, doped zinc oxide, indium zinc oxide ($ZN_3In_2O_6$), indium tin oxide (ITO), ITO/metal/ITO (IMI) as disclosed in "Transparent Conductive Multilayer-Systems for FPD Applications," by J. Stollenwerk, B. Ocker, K. H. Kretschmer of LEYBOLD AG, Alzenau, Germany, the materials described in above-referenced U.S. Pat. No. 5,202,787, such as TEC 20 or TEC 15, available from Libbey-Owens-Ford Co. of Toledo, Ohio, other transparent conductive metal oxides, or other transparent conductors. Generally, the conductance of the top electrical conductor 40 will depend on its thickness and composition. IMI generally has superior conductivity compared with the other materials. IMI, however, is known to undergo more rapid environmental degradation and suffer from interlayer delamination. The thicknesses of the various layers in the IMI structure may vary, but generally the thickness of the first ITO layer ranges from about 10 Å to about 200 Å, the metal ranges from about 10 Å to about 200 Å, and the second layer of ITO ranges from about 10 Å to about 200 Å. If desired, an optional layer or layers of a color suppression material (not shown) may be deposited between The top electrical conductor 40 and the second rear surface 16 to suppress the reflection of any unwanted portions of the electromagnetic spectrum.

The bottom electrical conductor 42 may be a combination reflector/electrode and is preferably disposed on the third front surface 20. The bottom electrical conductor 42 comprises at least one layer of a reflective material, which serves as a mirror reflectance layer and also forms an integral electrode in contact with and in a chemically and electrochemically stable relationship with any constituents in the electrochromic medium 24. The bottom electrical conductor 42 may be mostly reflective or may be partially transmissive/partially reflective (or "transflective") as disclosed in commonly-assigned U.S. patent application Ser. No. 10/115,860, filed on Apr. 3, 2002, entitled "ELECTROCHROMIC REARVIEW MIRROR ASSEMBLY INCORPORATING A DISPLAY/SIGNAL LIGHT," by William L. Tonar et al., now U.S. Pat. No. 6,700,692, the entire disclosure of which is incorporated herein by reference. As an alternative, exterior rearview mirror element 10 could incorporate a transparent conductive material on the third surface, which acts as an electrode, and incorporate a reflector on the fourth surface. However, combining the "reflector" and "electrode" and placing both on the third surface is preferred because it makes the device manufacture less complex and allows the device to operate with higher performance. The bottom electrical conductor 42 is a combined reflector/electrode on the third surface which generally has higher conductance than a conventional transparent electrode as used on the third surface. One can either change the composition of the top electrical conductor 40 on the second surface to one that has lower conductance (being cheaper and easier to produce and manufacture) while maintaining coloration speeds similar to that obtainable with a fourth surface reflector device, while at the same time decreasing substantially the overall cost and time to produce the electrochromic device. If, however, performance of a particular design is of utmost importance, a moderate to high conductance transparent electrode can be used on the second surface, such as, for example, ITO, IMI, etc. The combination of a high conductance (i.e., less than 250 preferably less than 15) reflector/electrode on the third surface and a high conductance transparent electrode on the second surface will not only produce an electrochromic device with more even overall coloration, but will also allow for increased speed of coloration and clearing. Furthermore, in fourth surface reflector mirror assemblies, there are two transparent electrodes with relatively low conductance, and in previously used third surface reflector mirrors, there is a transparent electrode and a reflector/electrode with relatively low conductance and, as such, a long buss bar on the front and rear element to bring current in and out is necessary to ensure adequate coloring speed. The bottom electrical conductor 42 of the present invention can be metallic and have a higher conductance and therefore has a very even voltage or potential distribution across the conductive surface, even with a small or irregular contact area, thereby providing greater design flexibility by allowing the electrical contact for the third surface electrode to be very small (if desired) while still maintaining adequate coloring speed.

It can be desirable in the construction of outside rearview mirrors to incorporate at least one thinner glass element in order to decrease the overall weight of the mirror so that the mechanisms used to manipulate the orientation of the mirror are not overloaded. Decreasing the weight of the device also improves the dynamic stability of the mirror assembly when exposed to vibrations. Alternatively, decreasing the weight of the mirror element may permit more electronic circuitry to be provided in the mirror housing without increasing the weight of the mirror housing. In the illustrated embodiment, the first substrate 12 comprises glass that is at least 2.0 mm in thick, although either thicker or thinner glass can be used. The thicker glass provides for a greater grind depths and a greater field of view for a given grind radius. To reduce the weight of the exterior rearview mirror element 10, the rear substrate 18 can comprise a piece of glass or other substrate that is thinner than the first substrate 12. The rear substrate 18 can be about 1.6 mm thick or less. More preferably, the rear substrate 18 can be about 1.1 mm or less. Thin glass may be prone to warpage or breakage, especially when exposed to extreme environments. This problem is substantially improved by using an improved electrochromic device incorporating two thin glass elements having an improved gel material. This improved device is disclosed in commonly assigned U.S. Pat. No. 5,940,201 entitled "ELECTROCHROMIC MIRROR WITH TWO THIN GLASS ELEMENTS AND A GELLED ELECTROCHROMIC MEDIUM," filed on Apr. 2, 1997. The entire disclosure of this patent is incorporated herein by reference. The addition of the bottom electrical conductor 42 that is a combined reflector/electrode onto the third front surface 20 of the exterior rearview mirror element 10 further helps remove any residual double imaging resulting from the two glass elements being out of parallel. Thus, the chamber 48 preferably contains a free-standing gel that cooperatively interacts with thin glass elements and to produce the exterior rearview mirror element 10 that acts as one thick unitary member rather than two thin glass elements held together only by a seal member. In free-standing gels, which contain a solution and a cross-linked polymer matrix, the solution is interspersed in a polymer matrix and continues to function as a solution. Also, at least one solution-phase electrochromic material is in solution in the solvent and therefore as part of the solution is interspersed in the polymer matrix (this generally being referred to as "gelled electrochromic medium"). This allows one to construct the exterior rearview mirror element 10 with thinner glass in order to decrease the overall weight of the exterior rearview mirror element 10 while maintaining sufficient structural integrity so that the exterior rearview mirror element 10 will survive the extreme conditions common to the automobile environment. This also helps maintain uniform spacing between the thin glass elements, which improves uniformity in the appearance (e.g., coloration) of the exterior rearview mirror element 10. This structural integrity results because the free-standing gel, the front element 12, and the rear element 18, which individually have insufficient strength characteristics to work effectively in an electrochromic mirror, couple in such a manner that they no longer move independently but act as one thick unitary member. This stability includes, but is not limited to, resistance to flexing, warping, bowing and breaking, as well as improved image quality of the reflected image, e.g., less distortion, double image, color uniformity, and independent vibration of each glass element. However, while it is important to couple the front element 12 and the rear element 18, it is equally important (if not more so) to ensure that the exterior rearview mirror element 10 functions properly. The free-standing gel must bond to the electrode layers (including the reflector/electrode if the mirror has a third surface reflector) on the walls of such a device, but not interfere with the electron transfer between the electrode layers and the electrochromic material(s) disposed in the chamber 48. Further, the gel must not shrink, craze, or weep over time such that the gel itself causes poor image quality. The device described above can ensure that the free-standing gel bonds well enough to the electrode layers to couple the front element 12 and the rear element 18 and does not deteriorate over time while allowing the electrochromic reactions to take place as though they were in solution.

To perform adequately, the exterior rearview mirror element 10 must accurately represent the reflected image, and this cannot be accomplished when the front element 12 and the rear element 18 tend to bend or bow while the driver is viewing the reflected image. The bending or bowing occurs mainly due to pressure points exerted by the mirror mounting and adjusting mechanisms and by differences in the coefficients of thermal expansion of the various components that are used to house the exterior mirror element. These components include a carrier plate used to attach the mirror element to the mechanism used to manipulate or adjust the position of the mirror (bonded to the mirror by an adhesive), a bezel, and a housing. Many mirrors also typically have a potting material as a secondary seal. Each of these components, materials, and adhesives has varying coefficients of thermal expansion that will expand and shrink to varying degrees during heating and cooling and will exert stress on the front element 12 and the rear element 18. On very large mirrors, hydrostatic pressure becomes a concern and may lead to double imaging problems when the front element 12 and the rear element 18 bow out at the bottom and bow in at the top of the exterior rearview mirror element 10. By coupling the front element 12 and the rear element 18, the thin/free-standing gel/thin element combination acts as one thick unitary member (while still allowing proper operation of the exterior rearview mirror element 10) and thereby reduces or eliminates the bending, bowing, flexing, double image, and distortion problems and non-uniform coloring of the electrochromic medium 24.

The cooperative interaction between the free-standing gel and the thin glass elements of the present invention also improves the safety aspects of exterior rearview mirror element 10 having thin elements. In addition to being more flexible, thin elements are more prone to breakage than thick elements. By coupling the free-standing gel with the thin elements, the overall strength is improved (as discussed above) and further restricts shattering and scattering and eases clean-up in the case of breakage of the exterior rearview mirror element 10.

The improved cross-linked polymer matrix used in the present invention is disclosed in commonly assigned U.S. Pat. No. 5,928,572 entitled "ELECTROCHROMIC LAYER AND DEVICES COMPRISING SAME" filed on Mar. 15, 1996. The entire disclosure of this patent is incorporated herein by reference.

A resistive heater 670 (see FIG. 12) may be disposed on the fourth rear surface 22 to heat the exterior rearview mirror element 10 and thereby clear the exterior rearview mirror element 10 of ice, snow, fog, or mist. The resistive heater may optionally be a layer of ITO, fluorine-doped tin oxide applied to the fourth surface, or may be other heater layers or structures well known in the art. It is contemplated that the rear fourth surface 22 of the rear element 18 could be flat or have a continuous radius without a depression to allow the heater to abut the rear elements 18 without any spacing and to allow the heater to easily abut the rear fourth surface 22.

An electrical circuit such as those taught in the above-referenced Canadian Patent No. 1,300,945 and U.S. Pat. Nos. 5,204,778, 5,434,407, 5,451,822, 6,402,328, and 6,386,713, is connected to and allows control of the potential to be applied across the top electrical conductor 40 and the bottom electrical conductor 42, such that electrochromic medium 24 will darken and thereby attenuate various amounts of light traveling therethrough and thus vary the reflectance of the exterior rearview mirror element 10 containing electrochromic medium 24. The electrical circuit used to control the reflectivity of the exterior rearview mirror element 10 preferably incorporates an ambient light sensor (not shown) and a glare light sensor (not shown), the glare light sensor being positioned either behind the exterior rearview mirror element 10 and looking through a section of the exterior rearview mirror element 10 with the reflective material completely or partially removed, or the glare light sensor can be positioned outside the reflective surfaces (e.g., in a bezel 58Z) or positioned behind a uniformly deposited transflective coating. Additionally, an area or areas of the electrode and reflector may be completely removed or partially removed to permit a vacuum fluorescent display, such as a compass, clock, or other indicia, to show through to the driver of the vehicle or as also described below, this light emitting display assembly can be shown through a uniformly deposited transflective coating. The present invention is also applicable to a mirror which uses only one video chip light sensor to measure both glare and ambient light and which is further capable of determining the direction of glare.

FIGS. 1 and 2 illustrate the first embodiment of the exterior rearview mirror element 10 of the present invention. In the first embodiment of the exterior rearview mirror element 10, the spotter optic 26 comprises a convex reflector 44 on the second rear surface 16 of the front element 12 (as viewed from the front of the exterior rearview mirror element 10). The convex reflector 44 includes a substantially spherical surface 46 having a reflective coating 49 thereon. As illustrated in FIG. 1, the convex reflector 44 defines the first area 28 of the exterior rearview mirror element 10 such that the first area 28 is smaller than the second area 30 of the exterior rearview mirror element 10. In the illustrated example, the spotter optic 26 has at least a portion thereof having a smaller radius of curvature than the radius of curvature of the first front surface 14 of the front element 12. For example, the spotter optic 26 can be substantially spherical or aspheric and the first front surface 14 can also be substantially spherical or aspheric, but with the first front surface 14 having a portion with a larger radius of curvature than the radius of curvature of the spotter optic. It is further considered that the first front surface 14 can be flat (radius of curvature=∞) and the spotter optic 26 can be substantially spherical or aspheric. Thus, it is contemplated that a first front surface 14 that is flat does have a radius of curvature, with the radius of curvature being infinity.

In the illustrated example, the reflective coating 49 can be conductive to form a portion of the top electrical conductor 40. Therefore, the electrochromic material 24 can darken behind the spotter optic 26 and below the spotter optic 26. However, the darkened electrochromic material 24 will not be viewed by the driver because of the reflective coating 49 will cover the electrochromic material 24. The reflective coating 49 or an optional the top electrical conductor 40 behind the reflective coating 49 allow the spotter optic 26 to contact the electrochromic material 24. Moreover, as illustrated in FIG. 2, it is contemplated that the reflective material 49 at a periphery 60 of the convex reflector 44 could overlap the top electrical conductor 40 at 101 (see FIG. 2) such that a line perpendicular 36 to the first front surface 14 of the front element 12 extends through both the top electrical conductor 40 and the reflective material 49. Therefore, the reflective material 49 could extend beyond the substantially spherical surface 46 and onto a portion of the remainder of the second rear surface 16. While the top electrical conductor 40 is illustrated as being located between the reflective material 49 and the second rear surface 16 of the front element 12 in FIG. 2, it is contemplated that the reflective material 49 could be located between the top electrical conductor 40 and the second rear surface 16 of the front element 12. It is also contemplated that the convex reflector 44 could overlap the top electrical conductor 40 (either above or below) by at least 0.5 mm and preferably by at least about 2 mm. Moreover, it is contemplated that the overlap of the convex reflector 44 and the top electrical conductor 40 encompasses substantially the entire periphery of the spotter optic 26.

Figure 3A:
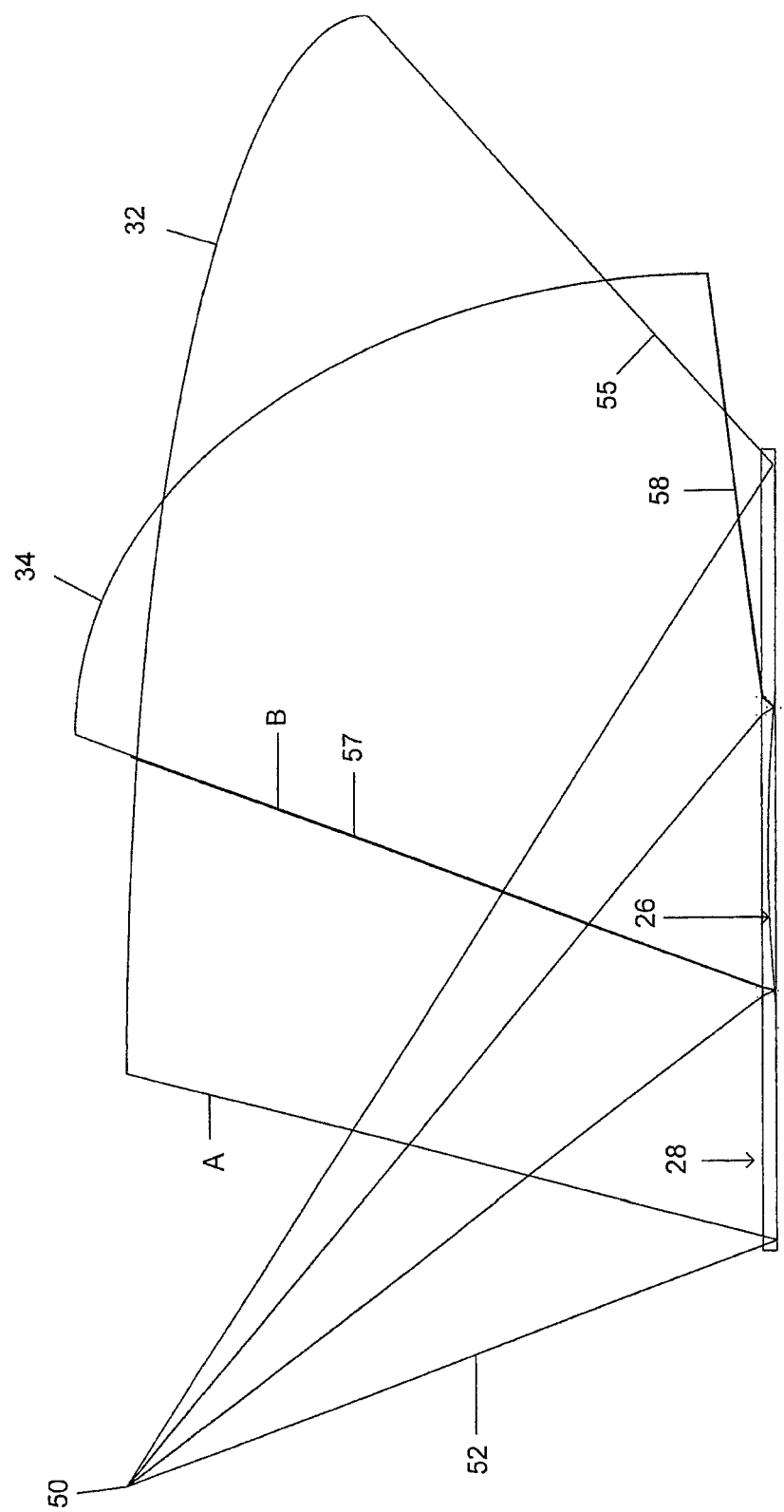
FIG. 3A is a schematic top view of the first embodiment of an exterior rearview mirror element embodying the present invention illustrating areas of reflection of the first embodiment of an exterior rearview mirror element embodying the present invention.

In the illustrated invention, the exterior rearview mirror element 10 provides the driver of a vehicle with the first zone 32 of reflection and the second zone 34 of reflection (see FIG. 3A). The first zone 32 of reflection is the typical reflection provided by an exterior side view mirror and allows the driver of the vehicle to see objects to the side and behind the vehicle within a first cone of reflection A. The second zone 34 of reflection allows the driver of the vehicle to see more objects to the side and behind the vehicle and/or a specific area (e.g., the ground by a door or blind spots) within a second cone of reflection B. The second cone of reflection B and the second zone 34 is different than the first cone of reflection A and the first zone 32.

As illustrated in FIG. 3A, a point of reference of the driver of the vehicle is represented by point 50. A first reflected line 52 represents an image reflected off of the exterior rearview mirror element 10 at a point closest to the driver at point 50. A second reflected line 55 represents an image reflected off of the exterior rearview mirror element 10 at a point furthest from the driver at point 50. As illustrated in FIG. 3A, the angle of incidence and the angle of reflection of each of lines 52 and 55 are approximately equal (although the angle of incidence and reflection of line 52 is different that the angle of incidence and reflection of line 55). A third reflected line 57 represents an image reflected off of the spotter optic 26 at a point closest to the driver at point 50. A fourth reflected line 58 represents an image reflected off of the spotter optic 26 at a point furthest from the driver at point 50. As illustrated in FIG. 3A, the angle of incidence of line 57 is smaller than the angle of reflection of line 57. Conversely, the angle of incidence of line 58 is larger than the angle of reflection of line 58. Therefore, the second cone of reflection B and the second zone 34 is different than the first cone of reflection A and the first zone 32. The spotter optic 26 therefore allows the driver to view an area around the vehicle in via the spotter optic 26 (the second area 30 of the exterior rearview mirror element 10) different than the remainder of the exterior rearview mirror element 10 (the first area 28 of the exterior rearview mirror element 10). It is noted that the light traveling through the front element 12 may experience some refraction, thereby enlarging the second cone of reflection B and the second zone 34 than they would be without any refraction (see below). It is further noted that FIG. 3A illustrates the reflection of images off of the exterior rearview mirror element 10 as taking place off of the second rear surface 16 of the front element 12 with the understanding that the images reflected in the first area 28 will in practice reflect off of the third front surface 20 or the fourth rear surface 22 of the rear element 18. However, reflection off of the third front surface 20 or the fourth rear surface 22 of the rear element 18 in practice will not substantially alter the first zone 32 as represented in FIG. 3A.

Figure 3B:
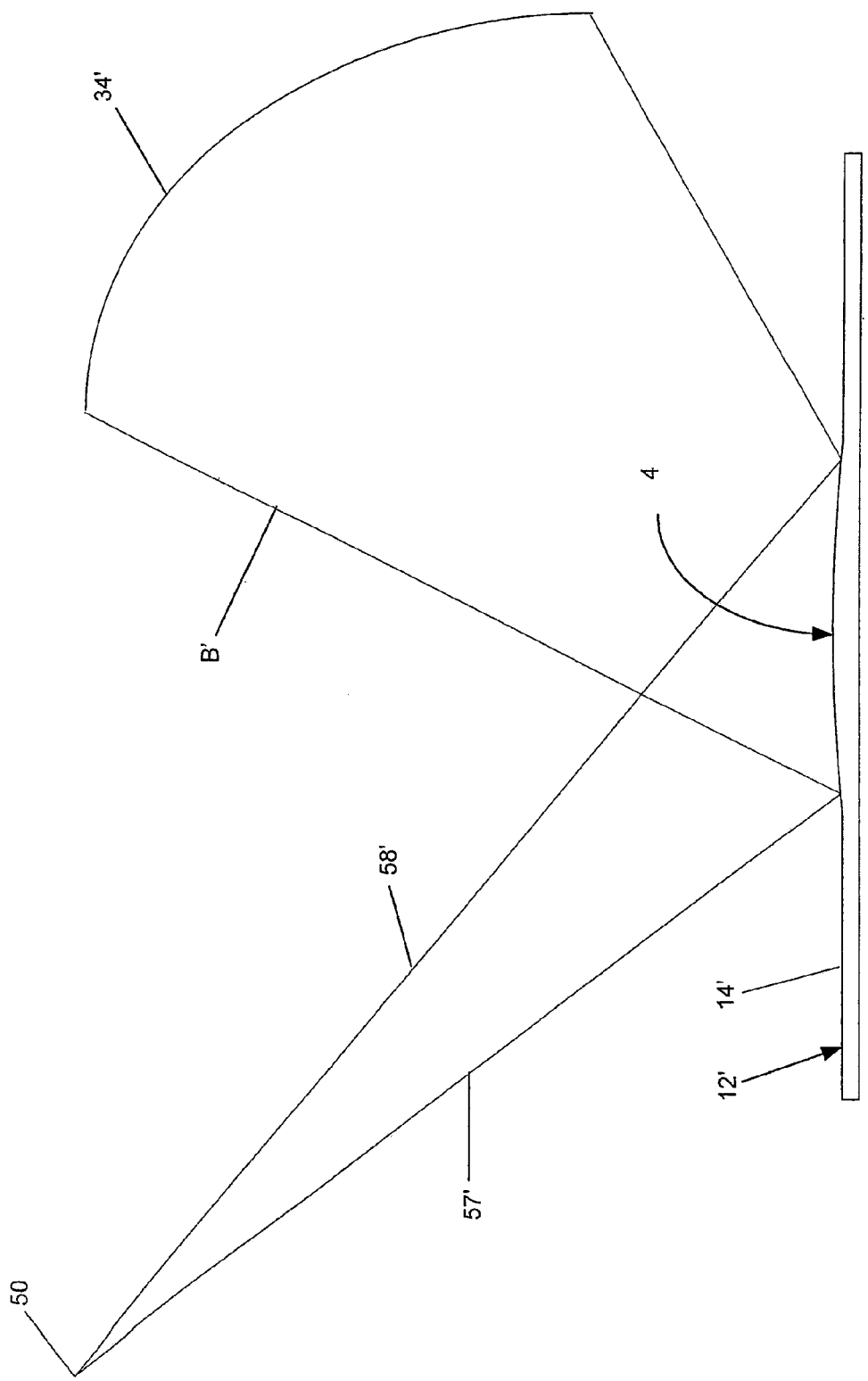
FIG. 3B is a schematic top view of a first surface spotter mirror illustrating areas of reflection.

FIG. 3B illustrates a reflected image from the point of reference of the driver of the vehicle is represented by point 50 off of a spotter mirror 4 on a front surface 14' of a first element 12'. FIGS. 3A and 3B illustrate the wider field of vision of the spotter optic 26 of the present invention compared to the spotter mirror 4 on the first front surface 14' of the first element 12'. As discussed above, FIG. 3A illustrates the third reflected line 57 and the fourth reflected line 58 as they reflect off of the spotter optic 26. FIG. 3B illustrates a first reflected line 57' that has the same angle from the point 50 to the spot that the reflected line 57' encounters the front surface 14' of the first element 12' as the third reflected line 57 from the point 50 in FIG. 3A. FIG. 3B also a second reflected line 58' that has the same angle from the point 50' to the spot that the reflected line 58' encounters the front surface 14' of the first element 12' as the fourth reflected line 58 from the point 50 in FIG. 3A. Comparing FIGS. 3A and 3B, the third reflected line 57 reflected off of the spotter optic 26 of the present invention has a smaller angle of reflection than the reflected line 57' reflected off of the spotter mirror 4. Furthermore, the fourth reflected line 58 reflected off of the spotter optic 26 of the present invention has a larger angle of reflection than the reflected line 58' reflected off of the spotter mirror 4. Therefore, the second cone of reflection B as illustrated in FIG. 3A is larger than the cone of reflection B' (the area between lines 57' and 58' of FIG. 3B) as illustrated in FIG. 3B. For example, it is contemplated that the spotter optic 26 of the present invention could include a 62° field of view while the spotter mirror 4 would only have a 33.6° field of view when the spotter optic 26 and the spotter mirror 4 have identical dimensions. The second cone of reflection B as illustrated in FIG. 3A is larger than the cone of reflection B' as illustrated in FIG. 3B because the light traveling through the first element 12 is refracted as illustrated in FIG. 3A. The first element 12 can therefore be constructed in such a way as to take advantage of the index of refraction of a transparent substrate to increase the effective field of view of a reflective surface without the need to increase the size of the reflecting surface or the need to decrease the radius of curvature on the reflective surface.

The examples as shown in FIGS. 3A and 3B illustrate that the exterior rearview mirror element 10 can be constructed in such a way as to take advantage of the index of refraction of the first element 12 to increase an effective field of view of the spotter optic 26 without the need to increase the size of the reflecting surface of the spotter optic 26 and/or the need to decrease a radius of curvature of the reflecting surface as compared to the spotter mirror 4 on the first front surface 14'. In other words, if the spotter optic 26 and the spotter mirror 4 have the same size of reflecting surface and the same radius of curvature, the spotter optic 26 will have a larger effective field of view. Nevertheless, variations of thickness of the first element 12, radius of curvature of the spotter optic 26, viewing distances (the distance between the point 50 and the spotter optic 26), location of the exterior rearview mirror element 10, index of refraction of the first element 12, etc. can be modified during design to optimize performance of the exterior rearview mirror element 10.

In the illustrated example, it is contemplated that the convex reflector 44 could include features to prevent distortion of the image reflected off of the convex reflector 44. Distortion of an image viewed at an edge of the convex reflector 44 can be caused by a change in radius of the substantially spherical surface 46 (e.g., at the intersection of the first front surface 14 of the front element 12 (having a substantially planar or a radius of curvature substantially larger than a radius of curvature of the substantially spherical surface 46) and the substantially spherical surface 46) and by a rate in change of the radius of curvature of the substantially spherical surface 46. It is contemplated that the first front surface 14 of the front element 12 could include a masking element (e.g., black dots) positioned over the periphery 60 of the convex reflector 44. It is also contemplated that the reflective coating 49 could be removed adjacent at edges of the convex reflector 44 and could also include no reflective material on the third front surface 20 or the fourth rear surface 22 of the rear element 18 behind the convex reflector 44 (to prevent any image from being reflected at the edge of the convex reflector 44). The masking element would prevent an image to be reflected off of the convex reflector 44 at the areas where distortion would occur.

Distortion may also occur at a transition region 62 generally defined between the spotter optic 26 and the second rear surface 16 of the front element 12 proximate the periphery 60 of the convex reflector 44. Typically, the transition region 62 does not include a single radius of curvature, nor a planar shape. Accordingly, images viewed at the transition region 62 generally appear distorted. The smaller the transition region 62, the less distortion is typically visible at the interface of the spotter optic 26 and the second rear surface 16 of the front element 12. Conversely, the larger the transition region 62, the more distortion is typically visible at the interface of the spotter optic 26 and the second rear surface 16 of the front element 12. The amount of distortion depends, in part, on the amount of rounding at the transition region 62 between the spotter optic 26 and the second rear surface 16 (which may be curved or flat). The amount of roll off and therefore distortion is generally a result of the grinding and polishing process that occurs during the manufacture of the exterior rearview mirror element 10. During the grinding process, a grinder head is used to form the spotter optic 26 to a desired depth in the second rear surface 16 of the front element 12. The grinding process leaves a rough shape for the spotter optic 26, which is then polished. During the polishing process, a polishing pad is used to remove imperfections formed during the grinding process. Care should be exercised to minimize overlap of the polishing pad from the spotter optic 26 onto the second rear surface 16. Large overlap of the polishing pad can result in a large transition region, resulting in more roll off and more distortion.

One embodiment of measuring roll-off includes using a Taylor Hobson Form Talysurf Laser 635 aspheric measurement system provided by Taylor Hobson Precision, the profile of a given spotter optic 26 can be evaluated relative to the second rear surface 16 of the front element 12. Readings relating to the relative height of the spotter optic 26, the transition region 62, and the second rear surface 16 of the front element 12 can be taken every 0.005 mm across the spotter optic 26, transition region 62, and the second rear surface 16 of the front element 12. To define the size of the transition region 62, best fit lines can be used to graphically define a theoretical intersection of the spherical shape of the spotter optic 26 and the curved or planar shape of the second rear surface 16 of the front element 12. In the illustrated graphical examples shown in FIGS. 13-16, points are plotted every 0.075 mm. Thus, the spacing between the points on the graph need not match the spacing between readings taken.

To determine a best fit line 63 for the spherical curve of the spotter optic 26, readings can be recorded every 0.005 mm in the spherical area defined by the spotter optic 26. In the illustrated embodiment, that are outside the transition region 62 are used to define the best fit line 63. More specifically, in the illustrated embodiment, only points that are at least 1.5 mm inside the transition region 62 are used to define the best fit line 63. The best fit line 63 graphically depicts the relative height across the spotter optic 26. The best fit lines 63 depicted in the graphical illustrations of FIGS. 13-16 are created based on a least-squares fitting algorithm method, such as that generally disclosed in the document entitled "Least-Squares Fitting Algorithms of the NIST Algorithm Testing System," *J. Res Natl. Inst. Stand. Technol.* 103, 633 (1998), which is incorporated in its entirety herein by reference. The best fit line 63 generally defines the spherical shape of the spotter optic 26, which, in the illustrated embodiment, includes a single radius. As noted above, by not using measurements at or near the transition region 62 in the calculation, the best fit line 63 maintains a relatively consistent slope along the graph. It will be understood by one having ordinary skill in the art that the term "line," as generally used herein, may be used to define a straight line or a curved line. In the case where the spotter optic 26 defines a portion of a sphere, the best fit line 63 is calculated based on the best fit for a circle.

The Taylor/Hobson Form Talysurf Laser 635 aspheric measurement system can also be used to measure points on the second rear surface 16 of the front element 12. These points can be used to calculate a best fit line 64. As before, with the measurements of the spotter optic 26, points outside the transition region 62 can be used to define the best fit line 64. More specifically, in the illustrated embodiment, only points that are at least 1.5 mm outside of the transition region 62 and on the non-ground substrate of the second rear surface 16 of the front element 12 are used to define the best fit line 64. The best fit line 64 generally defines the planar shape of the second rear surface 16 of the front element 12. In the event the second rear surface 16 of the front element 12 is arcuate, the best fit line 64 will generally define the arcuate shape of the second rear surface 16. By not taking measurements at or near the transition region 62, the best fit line 64 maintains a relatively consistent slope along the graph. The best fit lines 64 depicted in the graphical illustrations of FIGS. 13-16 are created based on a least-squares fitting algorithm method, such as that generally disclosed in the document entitled "Least-Squares Fitting Algorithms of the NIST Algorithm Testing System," *J. Res Natl. Inst. Stand. Technol.* 103, 633 (1998).

The best fit line 63 for the spotter optic 26 and the best fit line 64 for the second rear surface 16 of the front element 12 intersect at an intersection point 65. Measurements of the transition region 62 may be taken to graphically define the shape of the transition region 62. The readings originally taken every 0.005 mm across the transition region 62 are used to define a profile 66 for the transition region 62. After recording points for the best fit lines 63 and 64, the points that are originally measured across the transition region 62 are used to calculate a distance D from the actual profile 66 of the transition region 62 to the intersection of the best fit line 63 and the best fit line 64. The best fit transition line generally defines the spherical shape of the spotter optic 26, which includes a single radius. A distortion level at the periphery of the spotter optic 26 is generally defined by the distance D from the transition region profile 66 to the intersection point 63 of the spotter optic 26 best fit line and the second rear surface 16 best fit line. The distance D between the actual profile 66 and the theoretical intersection of the best fit line 63 and the best fit line 64 generally defines the amount of roll off, which relates to the amount of distortion about the periphery 60 of the spotter optic 26. The larger the roll off distance D (FIGS. 13 and 14), the more distortion. The smaller the roll off distance D (FIGS. 15 and 16), the less distortion.

Using a proper grinding and polishing procedure, in one embodiment, the roll off in the transition region 62 on a typical exterior rearview mirror element 10 can be provided that is between 0.001 mm and 0.035 mm. In another embodiment, the roll off in the transition region 62 on a typical exterior rearview mirror element 10 can be provided that is between 0.004 mm and 0.020 mm. In yet another embodiment, the roll off in the transition region 62 on an exterior rearview mirror element 10 can be provided that is between 0.006 mm and 0.012 mm. In still another embodiment, the roll off in the transition region 62 on the exterior rearview mirror element 10 can be formed such that the distance D from the transition region 62 to the intersection of the first and second lines is 0.008 mm. It is generally contemplated that the area defined by the transition region 62 when viewed from the front of the exterior rearview mirror element 10 will be less than 20 percent of the size of the area defined by the spotter optic 26.

The illustrated spotter optic 26 can also have characteristics different than the remainder of the exterior rearview mirror element 10. For example, the spotter optic 26 could have a different reflectance than the remainder of the exterior rearview mirror element 10. It is contemplated that the difference between the average reflectance in the spotter optic 26 and average reflectance of the remainder of the exterior rearview mirror element 10 is greater than approximately 5 percent. This provides a distinguishing characteristic between the two areas to prevent confusion to the driver. Moreover, the spotter optic 26 could have a different color than the remainder of the exterior rearview mirror element 10.

In the illustrated example, when the spotter optic 26 at the second rear surface 16 of the front element 12 has electrochromic material 24 behind the spotter optic 26, activation of the electrochromic material 24 behind the spotter optic 26 is relatively invisible compared to the activation of the electrochromic material 24 in the first area 28. However, there may however be effects that emanate from the spotter optic 26 affecting the first area 28. If there are concentrations of active anodic and cathodic materials in the electrochromic material 24 that form in imbalanced ratios in certain regions in the exterior rearview mirror element 10 during an extended period of darkening of the electrochromic material 24, the darkening of the electrochromic material 24 in the imbalanced regions may not erase as quickly as they would if they remained balanced. Moreover, with the area in the chamber 48 behind the spotter optic 24 being different in size than for the rest of the chamber 48, segregation of the electrochromic material 24 may more easily occur, leading to the imbalanced regions. The chamber 48 may be constructed so that the area in the chamber 48 behind the spotter optic 26 is relatively isolated from the rest of the chamber 48. In one embodiment, the area in the chamber 48 behind the spotter optic 26 is relatively isolated from the rest of the chamber 48 by adding additional seal material in the chamber 48 behind the periphery of the spotter optic 26 to substantially physically isolate the electrochromic material 26 behind the spotter optic 26 from the electrochromic material 26 in the remainder of the chamber 48. The additional seal material will restrict movement of the electrochromic material 24 and may substantially reduce segregation of the electrochromic material 24. It is contemplated that the additional seal material around the periphery of the spotter optic 26 does not have to fully encompass the area in the chamber 48 behind the spotter optic 26. It is also contemplated that the electrochromic material 24 in the area in the chamber 48 behind the spotter optic 26 and the rest of the chamber 48 are continuous. This allows the area in the chamber 48 behind the spotter optic 26 and the rest of the chamber 48 to fill with electrochromic material 24 in one fill process and through one opening in the seal 56. Alternatively, the area in the chamber 48 behind the spotter optic 26 and the rest of the chamber 48 could be completely isolated, requiring two fill processes. One skilled in the art will recognize that materials other than the seal material could be added around the periphery of the spotter optic 26 to substantially physically isolate the electrochromic material 26 behind the spotter optic 26 from the electrochromic material 26 in the remainder of the chamber 48.

It is contemplated that the first embodiment of the exterior rearview mirror element 10 with the spotter optic 26 of the present invention could be made in any manner For example, the front element 14 could be formed in a fashion as described above and the substantially spherical surface 46 could be ground out of the second rear surface 16 of the front element 12. The substantially spherical surface 46 could be ground out of the second rear surface 16 of the front element 12 using grinding and polishing methods known in the art.

Figure 4:
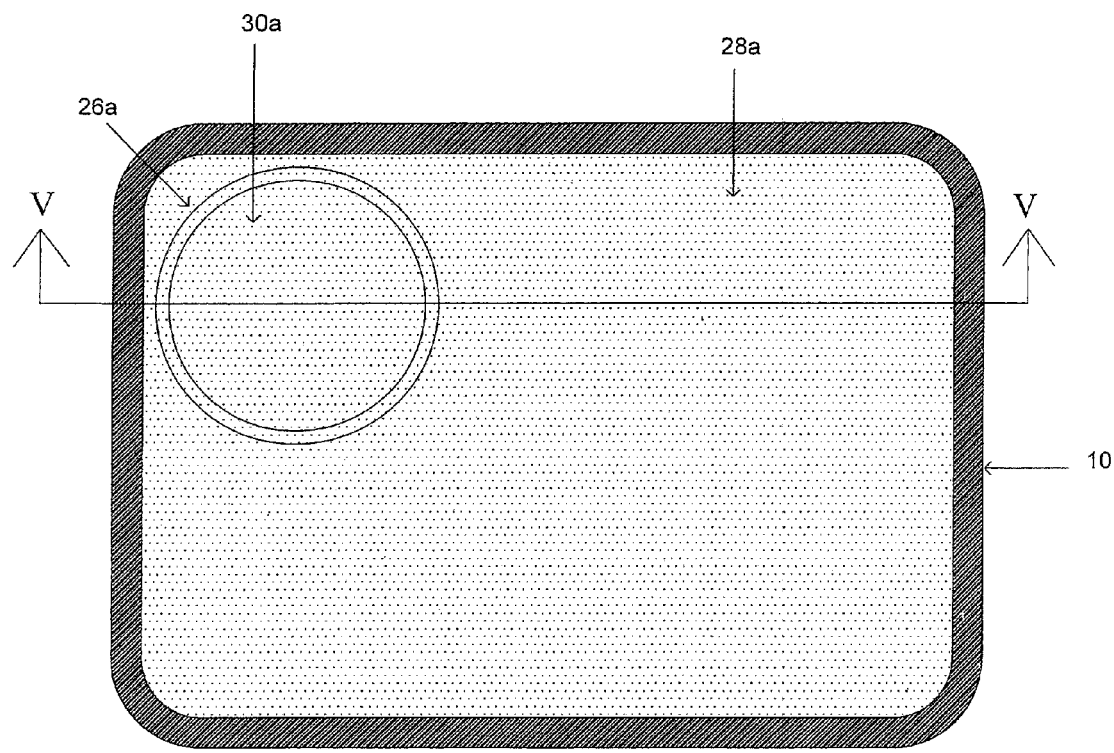
FIG. 4 is a front view of a second embodiment of an exterior rearview mirror element embodying the present invention.
Figure 5:
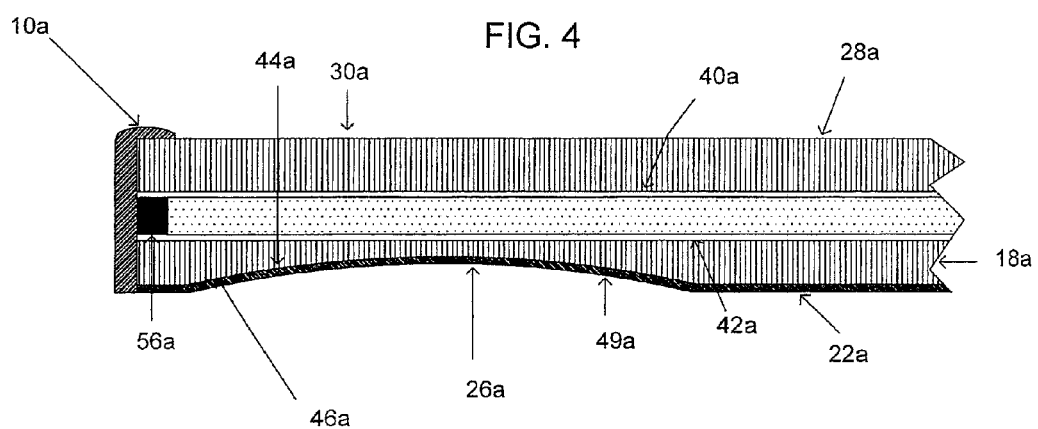
FIG. 5 is a cross-section view of the second embodiment of the exterior rearview mirror element embodying the present invention taken along the line V-V of FIG. 4.

The reference numeral 10a (FIGS. 4-5) generally designates another embodiment of the present invention, having a second embodiment for the exterior rearview mirror element. Since exterior rearview mirror element 10a is similar to the previously described exterior rearview mirror element 10, similar parts appearing in FIGS. 1-2 and FIGS. 4-5, respectively, are represented by the same, corresponding reference number, except for the suffix "a" in the numerals of the latter. The second embodiment of the exterior rearview mirror element 10a is substantially identical to the first embodiment of the exterior rearview mirror element 10, except that the spotter optic 26a comprises a convex reflector 44a on the fourth rear surface 22a of the rear element 18a (as viewed from the front of the exterior rearview mirror element 10a). The convex reflector 44a includes a substantially spherical surface 46a having a reflective coating 49a thereon. As illustrated in FIG. 4, the convex reflector 44a defines the first area 28a of the exterior rearview mirror element 10a such that the first area 28a is much smaller than the second area 30a of the exterior rearview mirror element 10a. It is noted that both the top electrical conductor 40a and the bottom electrical conductor 42a are transparent in the second embodiment of the exterior rearview mirror element 10a.

In the illustrated example, the substantially spherical surface 46a can be formed in the fourth rear surface 22a in the same manner as the substantially spherical surface 46 is formed in the second rear surface 16 of the first embodiment of the exterior rearview mirror element 10 as described above. Moreover, it is contemplated that the first front surface 14, the second rear surface 16 and/or the third front surface 20 could include a masking element (e.g., black dots) positioned over a periphery 60a of the convex reflector 44a and/or the reflective coating 49a could be removed adjacent at edges of the convex reflector 44a to prevent an image to be reflected off of the convex reflector 44a at the areas where distortion would occur.

Figure 6:
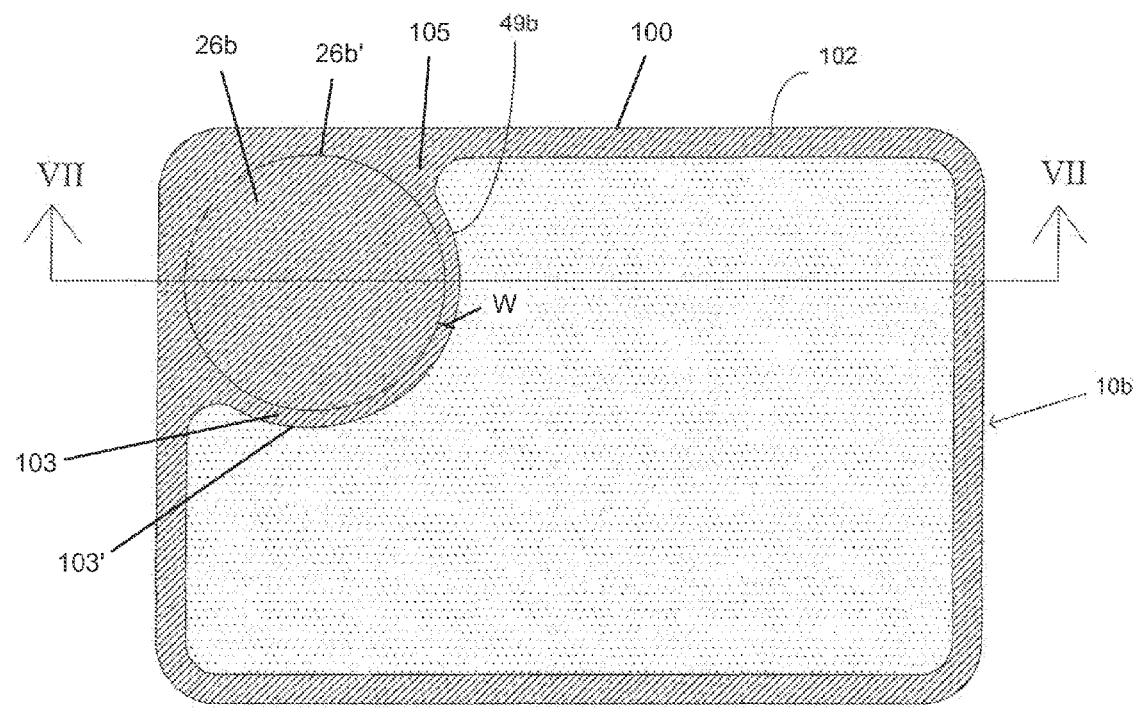
FIG. 6 is a front view of a third embodiment of an exterior rearview mirror element embodying the present invention.
Figure 7:
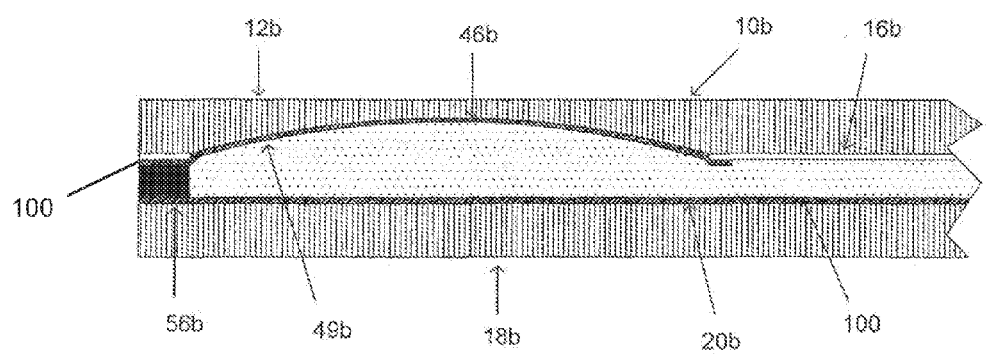
FIG. 7 is a cross-section view of the third embodiment of the exterior rearview mirror element embodying the present invention taken along the line VII-VII of FIG. 6.

The reference numeral 10b (FIGS. 6-7) generally designates another embodiment of the present invention, having a third embodiment for the exterior rearview mirror element. Since exterior rearview mirror element 10b is similar to the previously described exterior rearview mirror element 10, similar parts appearing in FIGS. 1-2 and FIGS. 6-7, respectively, are represented by the same, corresponding reference number, except for the suffix "b" in the numerals of the latter. The third embodiment of the exterior rearview mirror element 10b is substantially identical to the first embodiment of the exterior rearview mirror element 10, except that the reflective coating 49b is contiguous with a spectral filter material 100 covering a periphery 102 of second rear surface 16b of the front element 12b. The spectral filter material 100 is used to cover the seal 56b. Furthermore, the spectral filter material 100 can be reflective to provide the third embodiment of the exterior rearview mirror element 10b with a large reflective surface. The spectral filter material 100 can also extend slightly beyond the extent of the substantially spherical surface 46b as illustrated in FIG. 6. The spectral filter material 100 can be made of chrome and/or aluminum and/or other reflective materials. Using a spectral filter material 100 with an exterior rearview mirror element, its composition, its properties and its application along with properties of the materials adjacent the spectral filter material 100 are described in U.S. Pat. Nos. 7,864,398; 7,830,583; 7,746,534; 7,688,495; and 7,372,611, and U.S. Patent Application Publication Nos. 2011/0080629; 2011/0002028; 2010/0321758; 2010/0215903; and 2009/0207513; the entire contents of which are hereby incorporated herein by reference.

Referring to FIG. 6, a spectral filter material 103 that surrounds at least a portion of the periphery of the spotter optic 26b generally defines an arc that fully or partially circumscribes the spotter optic 26b, and that is substantially concentrically aligned with the spotter optic 26b. The width W of the spectral filter material 103 is generally defined as the space between an outside edge 26b' of the spotter optic 26b and an outside edge 103' of the spectral filter material 103, which is in the form of an arc. In one embodiment, at least 90 degrees ($\pi/2$ radians) or one-quarter of the arc will have a substantially uniform width W that varies by no more than 50 percent from the average width. In another embodiment, at least 90 degrees ($\pi/2$ radians) or one-quarter of the arc will have a substantially uniform width W that varies by no more than 10 percent from the average width. In another embodiment, at least 180 degrees ($\pi$ radians) or one-half of the arc will have a uniform width W that varies by no more than 50 percent from the average width. In yet another embodiment, at least 180 degrees ($\pi$ radians) or one-half of the arc will have a uniform width W that varies by no more than 10 percent from the average width. It will be understood that irregularities in the width W of the arc will occur at an intersection area 105 where the spectral filter material 103 merges with the spectral filter material 100 covering the periphery 102 of the second rear surface 16b of the front element 12b.

Figure 8:
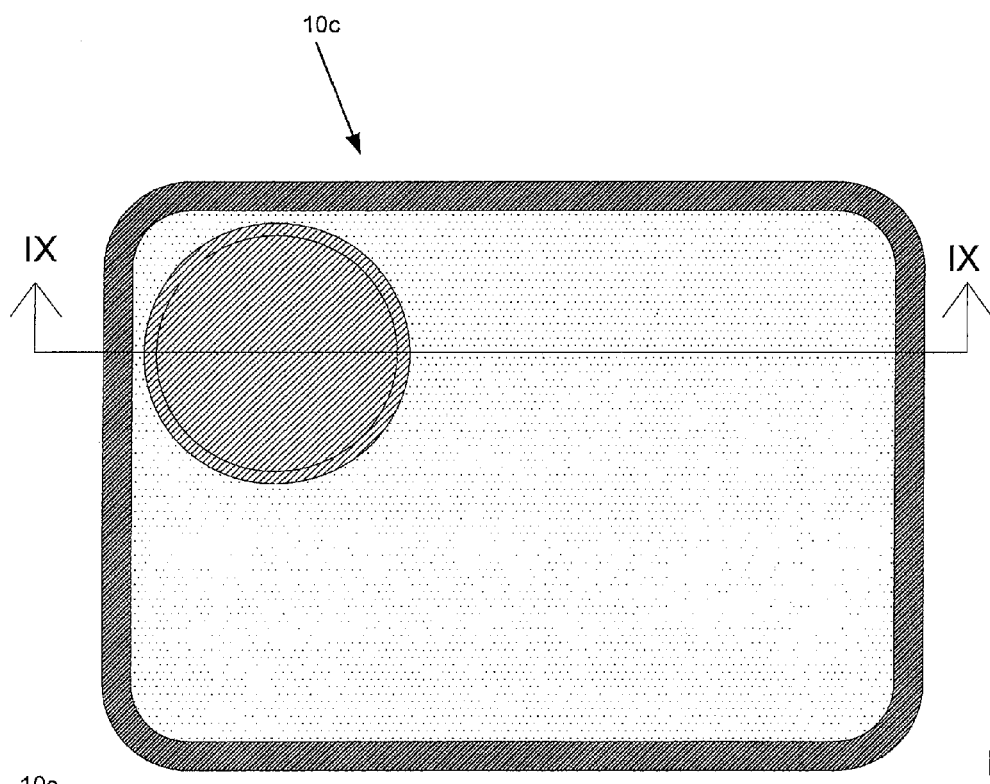
FIG. 8 is a front view of a fourth embodiment of an exterior rearview mirror element embodying the present invention.
Figure 9:
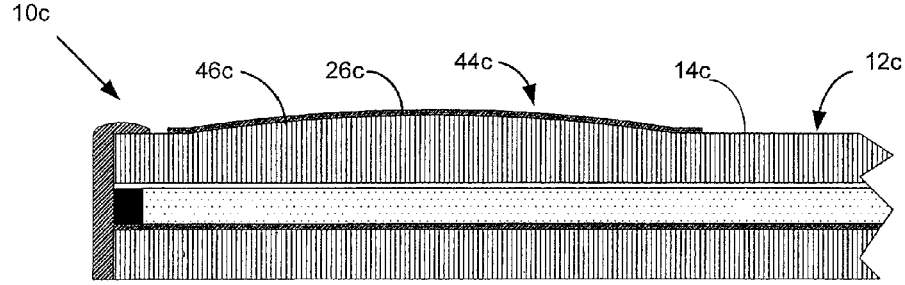
FIG. 9 is a cross-section view of the fourth embodiment of the exterior rearview mirror element embodying the present invention taken along the line IX-IX of FIG. 8.

The reference numeral 10c (FIGS. 8-9) generally designates another embodiment of the present invention, having a fourth embodiment for the exterior rearview mirror element. Since exterior rearview mirror element 10c is similar to the previously described exterior rearview mirror element 10, similar parts appearing in FIGS. 1-2 and FIGS. 8-9, respectively, are represented by the same, corresponding reference number, except for the suffix "c" in the numerals of the latter. The fourth embodiment of the exterior rearview mirror element 10c is substantially similar to the first embodiment of the exterior rearview mirror element 10, except that the spotter optic 26c comprises a convex reflector 44c including a protruding spherical surface 46c protruding from the first front surface 14c of the front element 12c (instead of the spotter optic 26c being at the second rear surface). It is contemplated that the front element 12c having the protruding spherical surface 46c could be formed in any manner For example, the first front surface 14c of the front element 12c could be etched to form the protruding spherical surface 46c or the protruding spherical surface 46c could comprises a convex reflector 44c adhered or otherwise attached to the first front surface 14c. It is also contemplated that the protruding spherical surface could be included on the third front surface 20 of the rear element 18. In such a situation, the third front surface, at least at the convex reflector, includes a bottom electrical conductor that is reflective. Additionally, any masking material can be located on the first front surface, the second rear surface and/or the third front surface.

Figure 10:
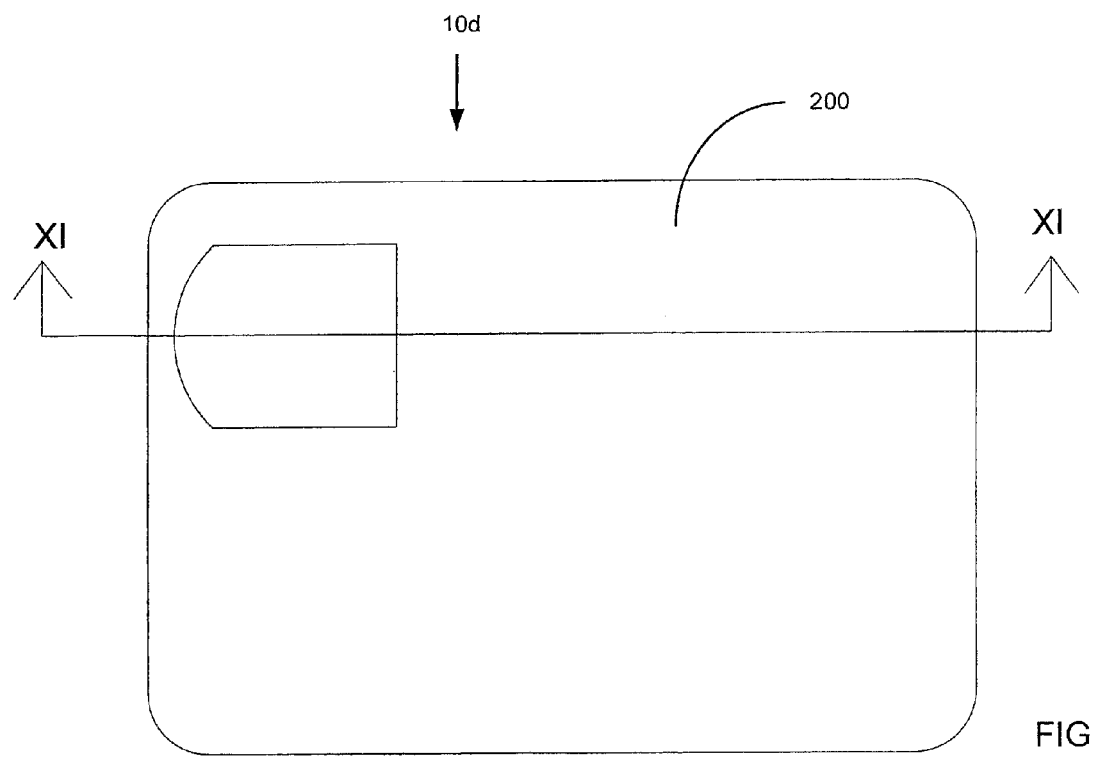
FIG. 10 is a front view of a fifth embodiment of an exterior rearview mirror element embodying the present invention.
Figure 11:
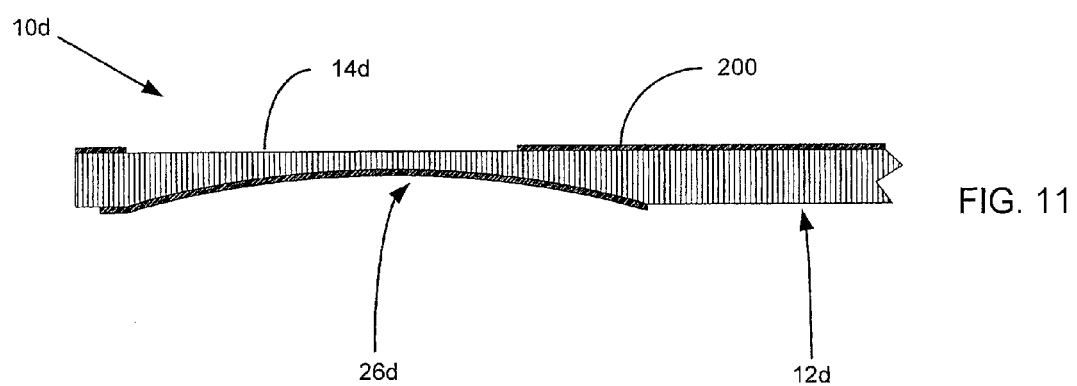
FIG. 11 is a cross-section view of the fifth embodiment of the exterior rearview mirror element embodying the present invention taken along the line XI-XI of FIG. 10.

The reference numeral 10d (FIGS. 10-11) generally designates another embodiment of the present invention, having a fifth embodiment for the exterior rearview mirror element. Since exterior rearview mirror element 10d is similar to the previously described exterior rearview mirror element 10, similar parts appearing in FIGS. 1-2 and FIGS. 10-11, respectively, are represented by the same, corresponding reference number, except for the suffix "d" in the numerals of the latter. The fifth embodiment of the exterior rearview mirror element 10d is substantially identical to the first embodiment of the exterior rearview mirror element 10, except that the fifth embodiment of the exterior rearview mirror element 10d only includes a front element 12d (with no rear element 18 and no electrochromic material 24). Furthermore, the first front surface 14d of the front element 12d includes reflective material 200 except in front of at least a portion of the spotter optic 26d. Moreover, it is contemplated that the reflective material 200 could be used as a masking element positioned over various portions of the convex reflector 26d to prevent an image from being reflected off of the convex reflector 26d at areas where distortion would occur or where a rearward field of view is not desired.

Figure 12:
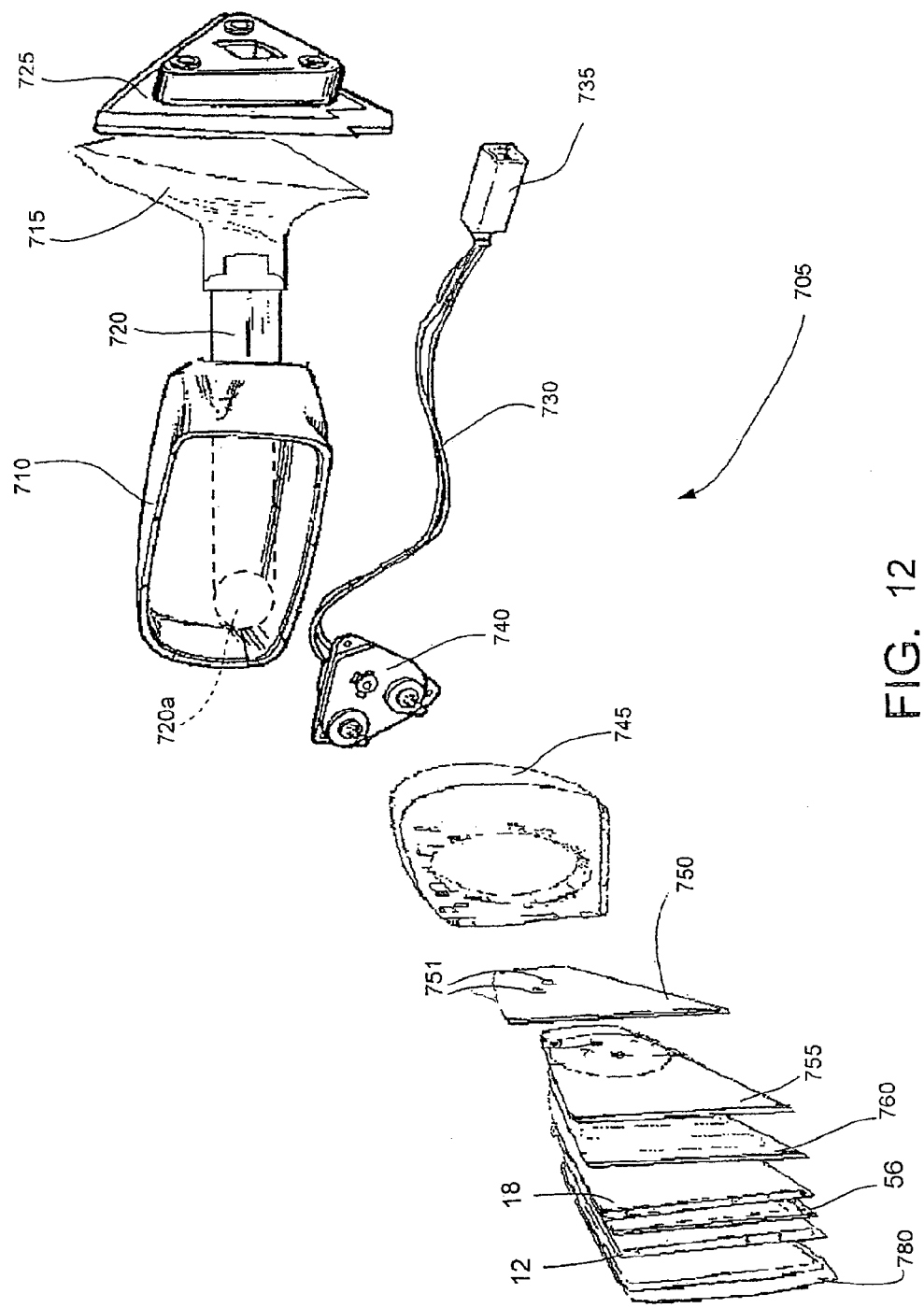
FIG. 12 depicts an exploded view of an exterior rearview mirror assembly having the exterior rearview mirror element of the present invention.
Figure 13:
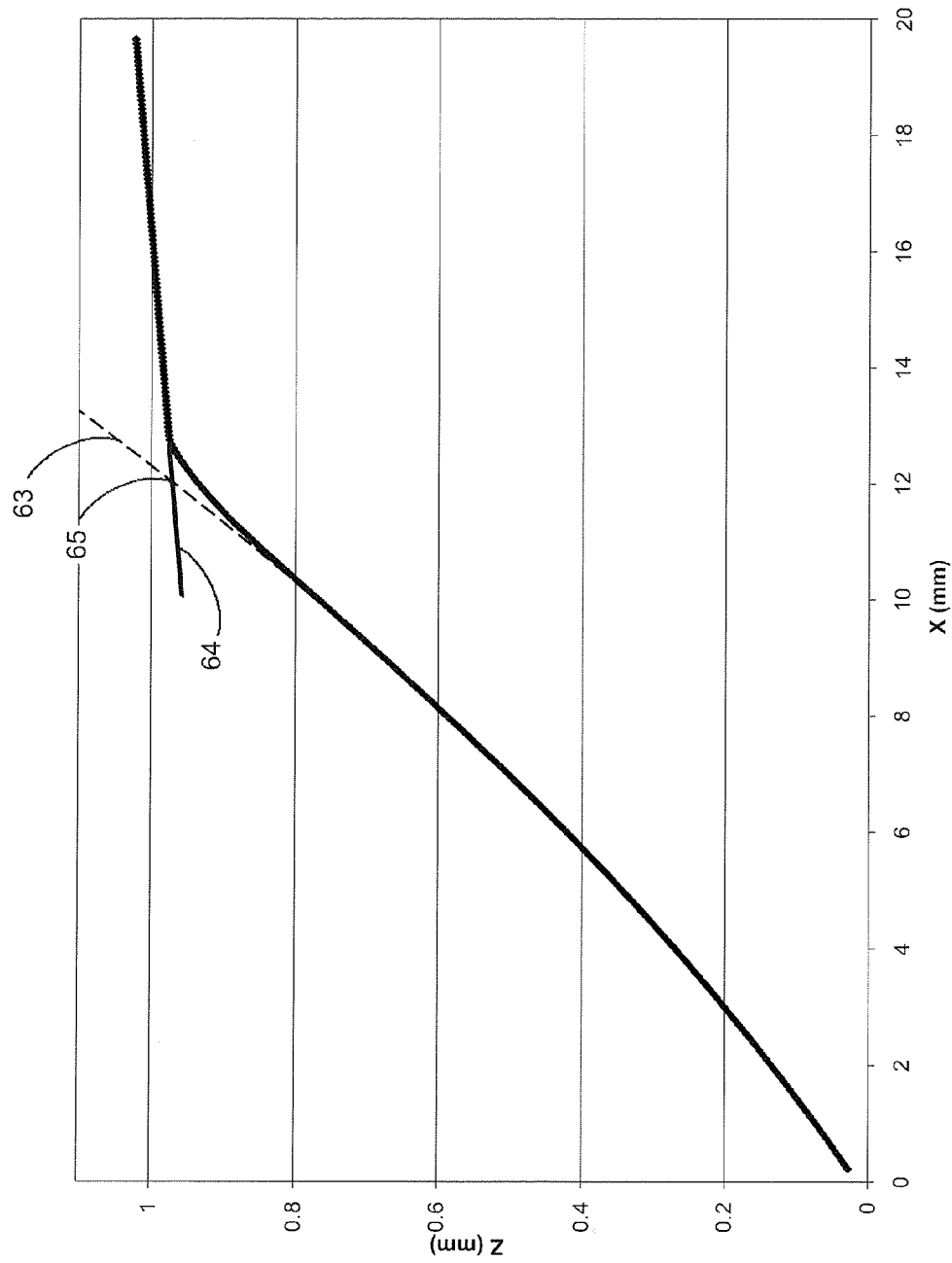
FIG. 13 depicts a graphical representation of a spotter mirror construction having a high level of distortion.
Figure 14:
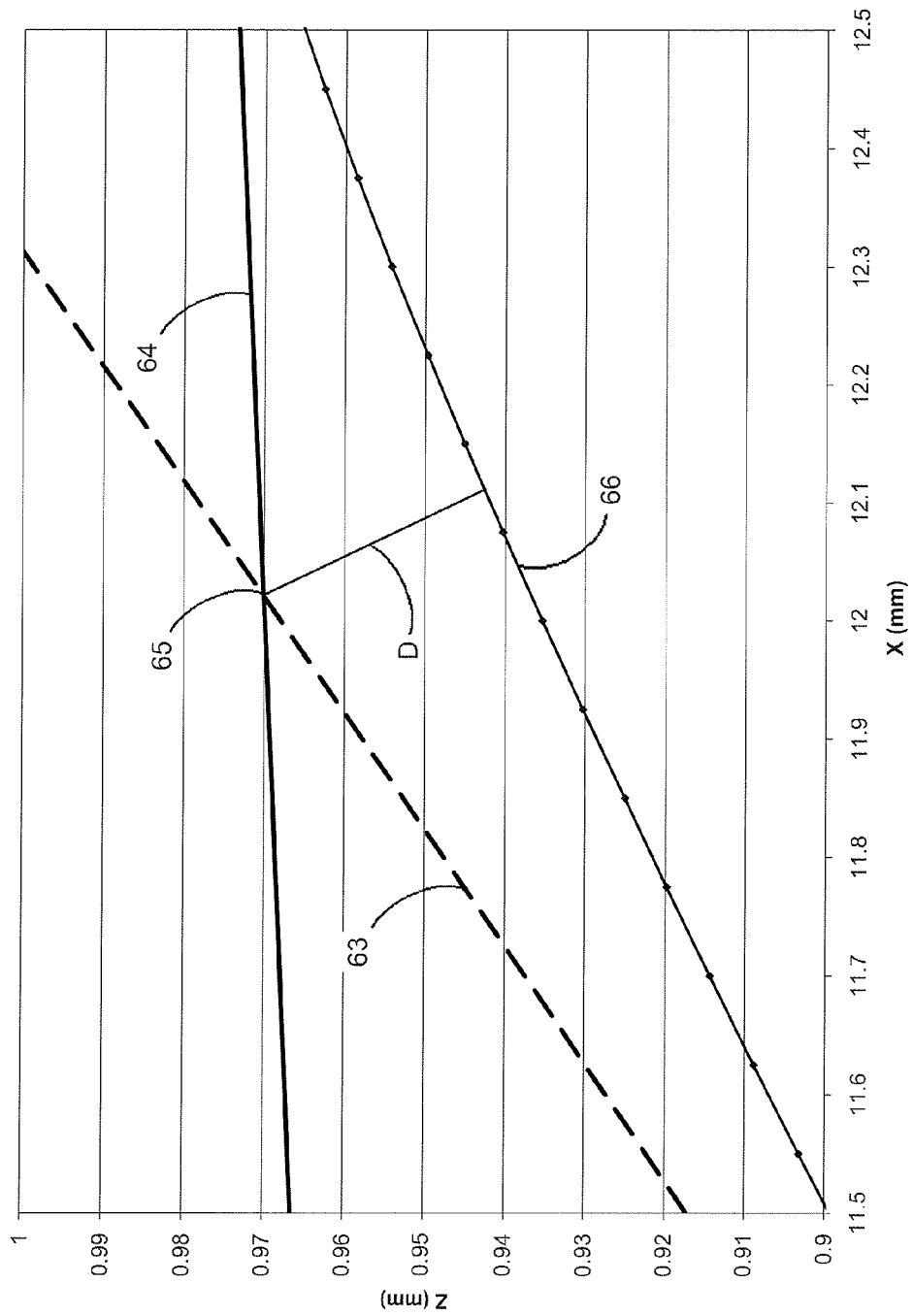
FIG. 14 depicts an enlarged graphical representation of a spotter mirror construction having a high level of distortion.
Figure 15:
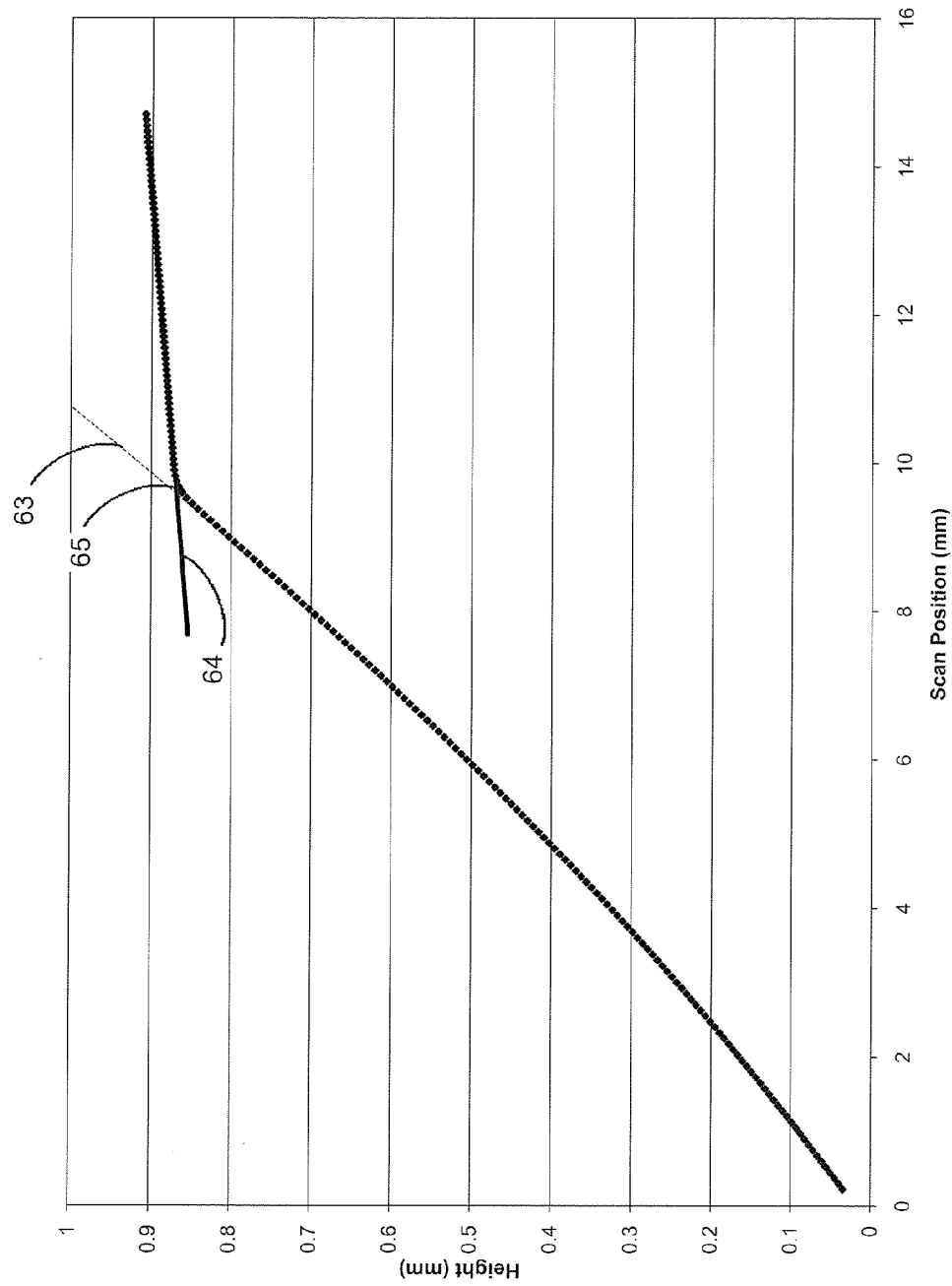
FIG. 15 depicts a graphical representation of a spotter mirror construction having a low level of distortion.
Figure 16:
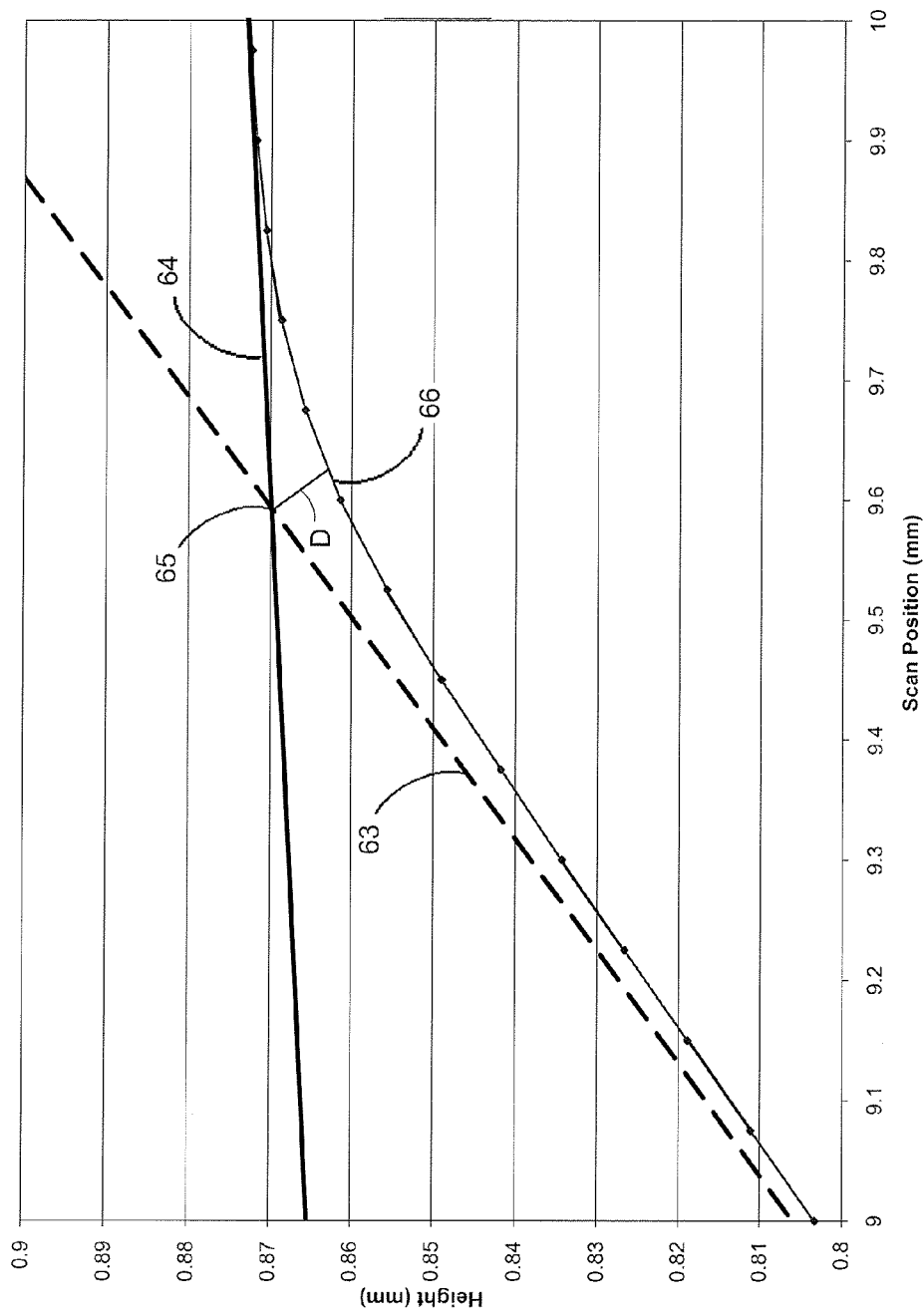
FIG. 16 depicts an enlarged graphical representation of a spotter mirror construction having a low level of distortion.

Turning now to FIG. 12, there is shown an exploded view of an exterior rearview mirror assembly 705 having the exterior rearview mirror element 10, 10a or 10b. The exterior rearview mirror assembly 705 has a housing 710 connected to an attachment member 715 via a telescoping extension 720. In at least one embodiment, the telescoping extension 720 comprises a single arm having a linear actuator for extending and retracting the telescoping extension from within the associated vehicle. The telescoping extension 720 may comprise a rack and pinion type linear actuator, an electrical solenoid type linear actuator, a pneumatic piston or a hydraulic actuator. The housing 710 may be configured such that the housing axially pivots about the telescoping extension. Additionally, the telescoping extension may be configured such that the housing may be folded inward toward the associated vehicle and outward away from the associated vehicle. The attachment member 715 is configured to be received by a vehicle mount 725. The vehicle mount may be fixed to a door panel, an A-pillar, a front fender, a window assembly, or any other position where a driver can view the scene generally rearward of the associated vehicle. It should be understood that the telescoping extension may comprise two or more arms and that the housing may be configured to pivot and fold irrespective of the number of arms employed. It should also be understood that the housing may be connected to a non-telescoping extension at a location shown as reference number 720a such that the housing pivots about the connection 720a such that the mirror may be positioned closer or farther from the vehicle as desired. This feature may be accompanied by a power positioning mechanism such that actuation may be performed inside the vehicle. It should be understood that the mirror housing, extension, and attachment member may be configured such that the telescoping, pivoting, and folding requires a manual operation.

A wiring harness 730 with a connector 735 is provided to interface the exterior mirror with associated apparatus located inside the associated vehicle. The wiring harness may be configured to provide extension, folding and pivoting of the housing and may also be configured to provide reflective element control, electrical power, turn signal actuation, mirror heater control, mirror element positioning, light sensor interface, exterior mirror circuit board interface, transceiver interface, information display interface, antenna interface, light source power and control, emergency flasher interface, and all other electrical features as described herein. It should be understood that operator interfaces are provided within the vehicle for each of these features where appropriate.

A mirror element positioner 740 is provided for aligning the associated reflective element within the housing from the interior of the associated vehicle. It should be understood that a corresponding operator interface is provided within the vehicle for positioning of the reflective element.

The positioner 740 is mechanically connected to a carrier 745 for providing a secure structure for supporting and moving of the associated reflective element. Examples of suitable carriers are described in U.S. Pat. Nos. 6,195,194 and 6,239,899, the disclosures of which are incorporated herein in their entireties by reference.

In at least one embodiment, a double-sided adhesive foam 750 is employed to attach the reflective element to the carrier. In certain instances, apertures 751 may be provided in the double-sided adhesive foam for accommodating positioning of various components.

In at least one embodiment, an electrical circuit board 755 is provided in the rearview mirror assembly. The electrical circuit board may comprise a light source such as a turn signal light, a keyhole illuminator, or an outside door area illuminator, as taught in U.S. Pat. No. 6,441,943, the entire disclosure of which is incorporated in its entirety herein by reference, an information display, an antenna, a transceiver, a reflective element control, an outside mirror communication system, a remote keyless entry system, proximity sensors, and interfaces for other apparatus described herein. U.S. Pat. Nos. 6,244,716, 6,523,976, 6,521,916, 6,441,943, 6,335,548, 6,132,072, 5,803,579, 6,229,435, 6,504,142, 6,402,328, 6,379,013, and 6,359,274 disclose various electrical components and electrical circuit boards that may be employed in one or more embodiments, the disclosures of each of these U.S. Patents are incorporated herein in their entireties by reference.

In at least one embodiment, a rearview mirror assembly is provided with a heater 760 for improving the operation of the device and for melting frozen precipitation that may be present. Examples of various heaters are disclosed in U.S. Pat. Nos. 5,151,824, 6,244,716, 6,426,485, 6,441,943 and 6,356,376, the disclosures of each of these Patents are incorporated in their entireties herein by reference.

In at least one embodiment, the rearview mirror assembly is provided with a bezel 780 for protecting the associated seal from damaging light rays and to provide an aesthetically pleasing appearance. Examples of various bezels are disclosed in U.S. Pat. Nos. 5,448,397, 6,102,546, 6,195,194, 5,923,457, 6,238,898, 6,170,956 and 6,471,362, the disclosures of which are incorporated herein in their entireties by reference.

It is contemplated that the spotter optic 26 could abut an edge of the front element 12 and/or rear element 18 (instead of being located within a central area of the elements as illustrated) such that the spotter optic is not circular. Moreover, it is contemplated that the spotter optic 26 could be non-spherical and/or have a non-circular periphery. Additionally, it is contemplated that the spotter optic 26 could comprise a lens instead of a mirror such that images reflected off of the third front surface 20 or the fourth rear surface 22 pass through a lens that bends the light such that the lens forms the first area 28 that reflects the first zone 32, with the second zone 34 being larger than the first zone 32. Moreover, it is contemplated that a third element could be employed with the spotter optic 26 on the third element such that the third element becomes the rear element and the rear element as discussed above is fully transparent or transparent in front of the spotter optic 26 on the third element. Additionally, adjustment of the relative color of the second area 30, the spectral filter material 100 and the first area 28 can be obtained by various methods. One embodiment is an application of a chrome layer in the second area 30 between successive application of layers of the top electrical conductor 40 (e.g., indium tin oxide ("ITO")). Another embodiment involves adding the top electrical conductor 40 to the second rear surface 14 of front element 12 before the spotter optic 26 is formed and then subsequently forming the spotter optic 26 in the second rear surface 14 and then adding the top electrical conductor 40 in the second area 30 and on the spectral filter material 100. Such techniques are related to those discussed in U.S. Pat. No. 7,372,611, the entire contents of which are hereby incorporated herein by reference. Some predetermined degree of color difference between the first area 28 and the second area 30 may assist in easy and quick location of the spotter optic 26 by the driver, yet color differences that are too great might be regarded as aesthetically undesirable, depending on the hues involved and the magnitude of those differences.

Figure 17:
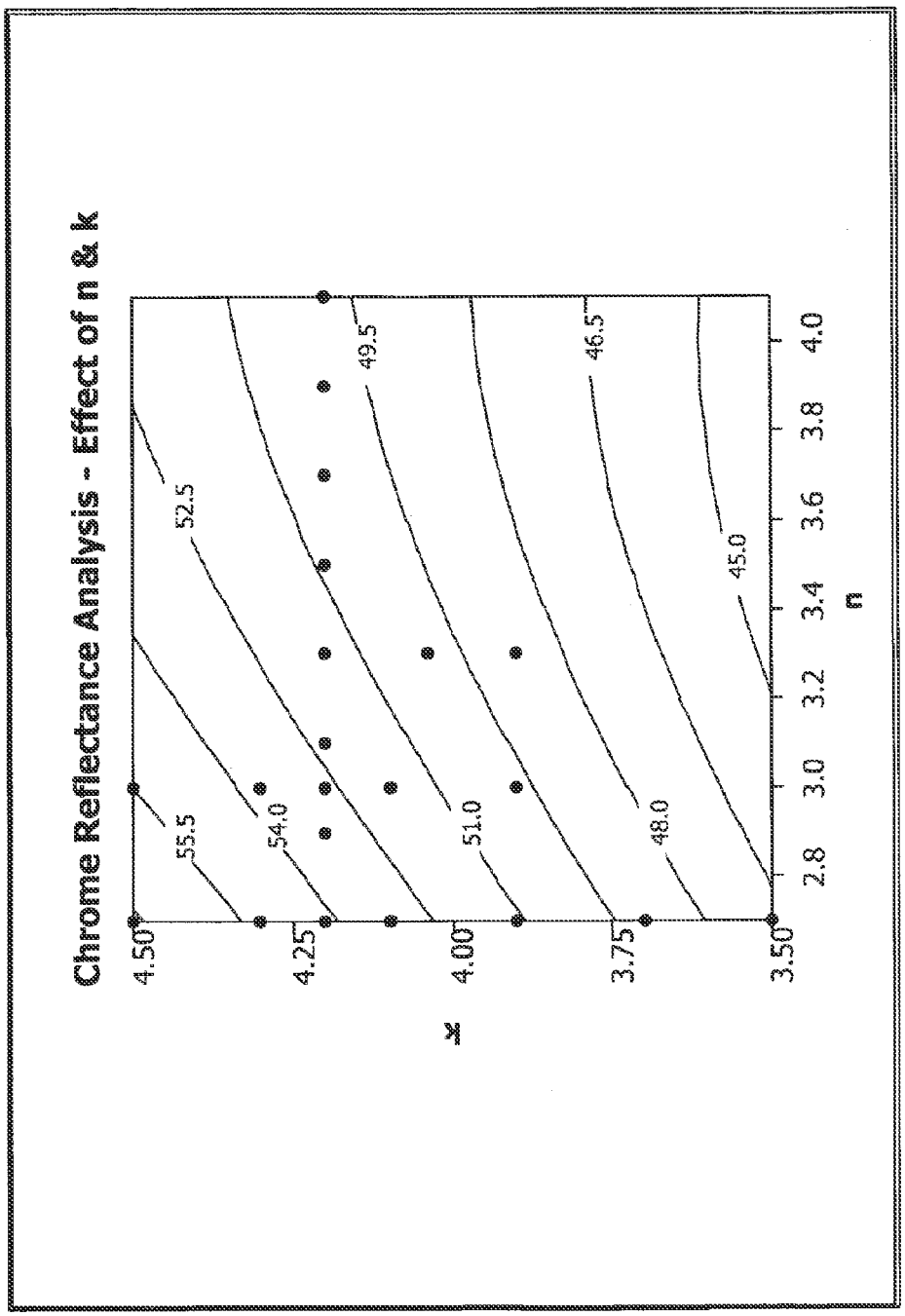
FIG. 17 depicts a graph of color related characteristics for various electro-optic element components.

Turning to FIG. 17 and Tables 1-4a, the color rendered as a result of having an indium-tin-oxide conductive electrode between the second surface of the first substrate and a spectral filter material, or ring, is described. In the example mirror element description contained herein, the reflectivity associated with the spectral filter material with respect to that of the third surface reflector results, in at least one embodiment, in a more blue hue for the spectral filter material when the electro-optic medium is in a "clear" sate. As depicted in the Tables contained herein, the b* of the reflector is higher than the b* of the spectral filter material. When there is mismatch between the hue of the main reflector and spectral filter material it is often desirable to have a spectral filter material with a lower b* value than the main reflective area. Many outside mirrors are designed to have a bluish hue in the main reflective area. As described in at least one embodiment herein, use of aluminum in combination with, or in lieu of, chrome for the spectral filter material provides additional color rendering options. Other options, or embodiments, are depicted with provide a better match between the ring and the mirror viewing area. In these other cases the spectral filter or ring has virtually identical reflectance and color allowing a seamless match between the viewing area and the ring. Table 1 summarizes various color characteristics, namely, Y specular included (A10); a*; b*; C* and Y specular excluded, for seven uniquely configured spectral filter materials, second surface conductive electrode and related materials.

Tables 1a through 1d contain variations for the spectral filter materials. The reflectance is in CIE-D65. Individual layers thicknesses are in nanometers. Table 1a shows the effect of chrome thickness on the stack Glass/ITO/Cr/Ru/Rh. The reflectance of the stack increases as the thickness of the chrome is thinned. In this example the refractive index of the chrome is n=3.4559 and k=3.9808. Where n represents the real portion and k represents the imaginary portion of a complex number. The refractive index of the chrome in part defines the reflectivity of the stack and will be discussed in more detail later. Also as the chrome is thinned the reflected a* values increase leading to a better match for the ring material.

In at least one embodiment, the reflectivity of the spectral filter is increased by putting Rhodium next to the first chrome layer instead of Ruthenium. Table 1b shows the effect of chrome thickness on the reflectance and color of the ring as the chrome thickness is changed. Again, like the previous example, the reflectance increases as the chrome layer is thinned. This example is preferred when the reflectance of the center of the mirror reflectance is relatively high.

Typical production mirror properties are shown below:

| Full Mirror Reference Color | | | |
|---|---|---|---|
| | Reflectance | a* | b* |
| Typical Outside Mirror | 56.3 | −2.2 | 2.4 |
| Typical Inside Mirror | 85.0 | −3.0 | 5.0 |

TABLE 1a alternate stacks - chrome thickness with ruthenium

| Run # | ITO | Cr | Ru | Rh | Cr | Ru | Rh | CIE-D65 R | a* | b* |
|---|---|---|---|---|---|---|---|---|---|---|
| 1 | 118 | 60 | 20 | 3.5 | | | | 45.5 | −6.1 | −3.1 |
| 2 | 118 | 20 | 20 | 3.5 | | | | 47.5 | −4.9 | −2.8 |
| 3 | 118 | 10 | 20 | 3.5 | | | | 50.24 | −4.3 | −2.3 |
| 4 | 118 | 5 | 20 | 3.5 | | | | 51.16 | −4.3 | −2.1 |
| 5 | 118 | 2.5 | 20 | 3.5 | | | | 51.17 | −4.3 | −1.9 |

TABLE 1b alternate stacks - chrome thickness with rhodium/ruthenium

| Run # | ITO | Cr | Ru | Rh | Cr | Ru | Rh | CIE-D65 R | a* | b* |
|---|---|---|---|---|---|---|---|---|---|---|
| 17 | 118 | 0 | | 5 | | | 30 | 59.82 | −3.3 | −0.14 |
| 18 | 118 | 2.5 | | 5 | | | 30 | 57.36 | −3.2 | −0.6 |
| 19 | 118 | 5 | | 5 | | | 30 | 54.9 | −3.3 | −1.1 |
| 20 | 118 | 7.5 | | 5 | | | 30 | 52.64 | −3.6 | −1.6 |
| 21 | 118 | 10 | | 5 | | | 30 | 50.66 | −3.9 | −2.2 |
| 22 | 118 | 12.5 | | 5 | | | 30 | 49.02 | −4.3 | −2.6 |

Table 1c depicts the effect of Ruthenium thickness when a thin Rhodium layer is used next to a thin chrome layer. A particular benefit is attained when the Ruthenium is approximately 20 nm. The minimum requirement of Ruthenium will vary with Rhodium thickness, the thin chrome thickness and the target reflectivity value.

TABLE 1c alternate stacks - varying ruthenium behind rhodium

| Run # | ITO | Cr | Ru | Rh | Cr | Ru | Rh | CIE-D65 R | a* | b* |
|---|---|---|---|---|---|---|---|---|---|---|
| 11 | 118 | 5 | | 2.5 | | 0 | | 19.63 | −8.5 | −3.4 |
| 12 | 118 | 5 | | 2.5 | | 10 | | 44.46 | −4.7 | −2.8 |

TABLE 1c-continued alternate stacks - varying ruthenium behind rhodium

| Run # | ITO | Cr | Ru | Rh | Cr | Ru | Rh | CIE-D65 R | a* | b* |
|---|---|---|---|---|---|---|---|---|---|---|
| 13 | 118 | 5 | | | | 2.5 | 20 | 52.9 | −3.7 | −1.6 |
| 14 | 118 | 5 | | | | 2.5 | 30 | 53.97 | −3.6 | −1.3 |
| 15 | 118 | 5 | | | | 2.5 | 40 | 53.4 | −3.9 | −1.6 |

Table 1d depicts the how the reflectance will change with Rhodium thickness at a fixed chrome and Ruthenium thickness. The intensity of the reflectance increases with increasing Rhodium thickness and the reflected a* increases. The increase in the reflected a* may be exploited to help improve the color match between the center of glass and the ring. The change in reflectance with changing Rhodium thickness will differ depending on the thickness of the chrome layer between the Rhodium and the ITO. The thicker the chrome layer, the more the Rhodium reflectance will be dampened. Also in Table 1d are alternate metals between a thin and thick chrome layer. Palladium, Iridium, Cadmium and Platinum are shown. The reflectance versus metal thickness is shown along with the effect of changing the thin chrome base layer thickness.

TABLE 1d alternate stacks - varying rhodium thickness

| Run # | ITO | Cr | Ru | Rh | Cr | Ru | Rh | CIE-D65 R | a* | b* |
|---|---|---|---|---|---|---|---|---|---|---|
| | 118 | 5 | | | | 0 | 30 | 52.59 | −4 | −1.6 |
| 14 | 118 | 5 | | | | 2.5 | 30 | 53.97 | −3.6 | −1.3 |
| 16 | 118 | 5 | | | | 5 | 30 | 54.9 | −3.3 | −1.1 |
| 19 | 118 | 5 | | | | 7.5 | 30 | 55.5 | −3.1 | −0.9 |

| | | | | | | |
|---|---|---|---|---|---|---|
| Glass | 1.2 mm | 1.2 mm | 1.2 mm | 1.2 mm | 1.2 mm | 1.2 mm |
| ITO | 120 | 120 | 120 | 120 | 120 | 120 |
| IRIDIUM | 3 | 6 | 9 | 12 | 15 | 18 |
| CR | 40 | 40 | 40 | 40 | 40 | 40 |
| R (cap Y) | 50.5 | 52.8 | 54.3 | 55.4 | 56.0 | 56.4 |
| Glass | 1.2 mm | 1.2 mm | 1.2 mm | 1.2 mm | 1.2 mm | 1.2 mm |
| ITO | 120 | 120 | 120 | 120 | 120 | 120 |
| Chrome | 1 | 2 | 4 | 6 | 8 | 10 |
| IRIDIUM | 15 | 15 | 15 | 15 | 15 | 15 |
| CR | 40 | 40 | 40 | 40 | 40 | 40 |
| R (cap Y) | 55.3 | 54.5 | 53.3 | 52.2 | 51.4 | 50.8 |
| Glass | 1.2 mm | 1.2 mm | 1.2 mm | 1.2 mm | 1.2 mm | 1.2 mm |
| ITO | 120 | 120 | 120 | 120 | 120 | 120 |
| Palladium | 3 | 6 | 9 | 12 | 15 | 18 |
| CR | 40 | 40 | 40 | 40 | 40 | 40 |
| R (cap Y) | 50.9 | 53.6 | 55.6 | 57.0 | 58.0 | 58.7 |
| Glass | 1.2 mm | 1.2 mm | 1.2 mm | 1.2 mm | 1.2 mm | 1.2 mm |
| ITO | 120 | 120 | 120 | 120 | 120 | 120 |
| Chrome | 1 | 2 | 4 | 6 | 8 | 10 |
| Palladium | 15 | 15 | 15 | 15 | 15 | 15 |
| CR | 40 | 40 | 40 | 40 | 40 | 40 |
| R (cap Y) | 56.5 | 55.2 | 53.0 | 51.5 | 50.4 | 49.6 |
| Glass | 1.2 mm | 1.2 mm | 1.2 mm | 1.2 mm | 1.2 mm | 1.2 mm |
| ITO | 120 | 120 | 120 | 120 | 120 | 120 |
| Platinum | 3 | 6 | 9 | 12 | 15 | 18 |
| CR | 40 | 40 | 40 | 40 | 40 | 40 |
| R (cap Y) | 49.7 | 51.3 | 52.3 | 52.9 | 53.1 | 53.2 |
| Glass | 1.2 mm | 1.2 mm | 1.2 mm | 1.2 mm | 1.2 mm | 1.2 mm |
| ITO | 120 | 120 | 120 | 120 | 120 | 120 |
| Chrome | 1 | 2 | 4 | 6 | 8 | 10 |
| Platinum | 15 | 15 | 15 | 15 | 15 | 15 |
| CR | 40 | 40 | 40 | 40 | 40 | 40 |
| R (cap Y) | 52.3 | 51.6 | 50.5 | 49.7 | 49.2 | 48.9 |
| Glass | 1.2 mm | 1.2 mm | 1.2 mm | 1.2 mm | 1.2 mm | 1.2 mm |
| ITO | 120 | 120 | 120 | 120 | 120 | 120 |
| Cadmium | 3 | 6 | 9 | 12 | 15 | 18 |
| CR | 40 | 40 | 40 | 40 | 40 | 40 |
| R (cap Y) | 52.3 | 56.5 | 59.9 | 62.5 | 64.6 | 66.1 |
| Glass | 1.2 mm | 1.2 mm | 1.2 mm | 1.2 mm | 1.2 mm | 1.2 mm |
| ITO | 120 | 120 | 120 | 120 | 120 | 120 |

TABLE 1d-continued alternate stacks - varying rhodium thickness

| Chrome | 1 | 2 | 4 | 6 | 8 | 10 |
|---|---|---|---|---|---|---|
| Cadmium | 15 | 15 | 15 | 15 | 15 | 15 |
| CR | 40 | 40 | 40 | 40 | 40 | 40 |
| R (cap Y) | 62.2 | 60.1 | 56.6 | 54.0 | 52.0 | 50.7 |

Different metals or mixtures of metals may be used next to the thin chrome layer. The thin chrome layer may be considered optional, it is used when an adhesion promoter layer is desired. Alternate adhesion promoting metals or materials may fulfill a comparable function. The different metals are selected to alter the reflectance, either higher or lower, depending on the match desired with respect to the center of the viewing area. The metal can have another benefit, that of altering the color or hue of the ring area. The presence of the ITO or other dielectric layer under the metals tends to move the color to a more negative b* direction. The use of a "red" high reflectance metal such as copper may both enhance reflectivity while simultaneously facilitating a color match to the viewing area. Table 1e shows the effect of a thin copper layer placed between two chrome layers. The reflectance is substantially increased while simultaneously making the ring color more neutral. A copper gold alloy has similar properties.

TABLE 1e

Color and reflectance effects of copper addition to stack

| | ITO | |
|---|---|---|
| | 114 | 114 |
| Chrome | 1 | 1 |
| Copper | 0 | 15 |
| Chrome | 40 | 40 |
| R | 47.3 | 56.2 |
| a* | −5.2 | −0.7 |
| b* | −3.5 | 2.3 |

Suitable metals which will result in increased reflectance include cadmium, cobalt, copper, palladium, silver, gold, aluminum and iridium or other high reflectance metals, their alloys and/or mixtures of metals.

TABLE 1

| Reflectance Trial | A10 Y | D65-2 (specular included) | | | D65-2 Macbeth Color Eye 7000 Y specular excluded |
|---|---|---|---|---|---|
| | | a* | b* | C* | |
| 1 856csito | 11.665 | 2.088 | −5.491 | 5.874 | 0.01 |
| 2 cswchr | 38.312 | −3.477 | 4.183 | 5.439 | 0.133 |
| 3 cswchral | 61.366 | −3.108 | 6.965 | 7.627 | 0.186 |
| 4 halfchral | 61.679 | −4.484 | 12.279 | 13.072 | 0.376 |
| 5 halfchr | 41 | −5.929 | 12.809 | 14.114 | 0.073 |
| 6 Tec15Chr | 23.76 | 0.984 | 8.603 | 8.659 | 1.322 |
| 7 Tec 15 | 11.284 | −3.363 | 0.442 | 3.392 | 0.162 |

1 - Glass/856 Ang. Al2O3/Half wave (Optical thickness) ITO
2 - 1 plus opaque chrome layer
3 - 1 plus approx 30 Ang. Chrome/250 Ang. Aluminum
4 - Glass/Half wave ITO/30 Ang. Chrome/250 Ang. Aluminum
5 - Glass/Half wave ITO/Opaque Chrome layer
6 - Glass/Tec15/Opaque chrome
7 - Tec 15

Table 2 summarizes various color characteristics, namely, a*; b*; C* and Y specular included (A10) for the combinations of various indium-tin-oxide second surface conductive electrodes positioned between a first substrate and a substantially opaque chrome spectral filter material. The data contained in this table depicts the ability to control the resulting b* value by varying the ITO thickness from approximately 65% to approximately 100% of a ½ wave thickness. Specific thicknesses anticipated to obtain a given color may vary somewhat based on deposition parameters that affect the optical constants. The color of a particular stack may vary, to some degree, based on choice of process parameters, as well as, process fluctuations that result in small, but, sometimes significant shifts in the optical constants of the materials used. For example, the half wave optical thickness of ITO will correspond to a lesser physical thickness if the physical density of the coating is increased and an increase absorption in the ITO coating would decrease the reflectivity of a second surface ITO plus chrome stack. This does not negate the fact that over the range of optical constants usually associated with ITO, a half wave optical thickness of ITO (relative to 550 nm) when coated with, for example, chrome, will tend to produce a reflection having a yellowish hue. Table 2a shows the same effect over a narrower range of ITO thicknesses and with a modified metal stack. As the ITO is increased in thickness the reflectance increases providing a better intensity match. The a* value decreases and the b* value increases. The net effect is that the color match will be improved with the appropriate ITO thickness. Or if a color mismatch is chosen the color of the spectral filter material can be made to have a lower b* value than the main reflective area.

TABLE 2

TCO plus Chrome Specular Included

| Trial | a* | b* | C* | A10Y |
|---|---|---|---|---|
| 85CHR | −6.801 | 2.486 | 7.241 | 44.829 |
| 80CHR | −6.717 | −0.829 | 6.768 | 44.375 |
| 75CHR | −6.024 | −4.031 | 7.248 | 43.759 |
| 70CHR | −5.613 | −5.426 | 7.807 | 42.917 |
| 65CHR | −5.227 | −6.639 | 8.45 | 42.64 |
| 100CHR | −7.06 | 12.85 | 14.662 | 45.255 |

TABLE 2a

Effect of ITO with modified metal stack

| Run # | ITO | Cr | Ru | Rh | Cr | Ru | Rh | CIE-D65 R | a* | b* |
|---|---|---|---|---|---|---|---|---|---|---|
| | 108 | 5 | 2.5 | | 30 | | | 52.3 | −2.5 | −4.5 |
| | 113 | 5 | 2.5 | | 30 | | | 53.2 | −3.1 | −3.0 |
| | 118 | 5 | 2.5 | | 30 | | | 54.0 | −3.6 | −1.3 |
| | 123 | 5 | 2.5 | | 30 | | | 54.5 | −4.1 | 0.6 |
| | 128 | 5 | 2.5 | | 30 | | | 54.9 | −4.5 | 2.6 |
| | 133 | 5 | 2.5 | | 30 | | | 55.1 | −4.7 | 4.7 |

Table 3 summarizes various color characteristics, namely, a*; b*; C* and Y specular included (A10) for various indium-tin-oxide second surface conductive electrodes. The data contained in this table depicts the resulting values produced by varying the ITO thickness from approximately 65% to approximately 100% of a ½ wave thickness.

TABLE 3

TCO Specular Included

| Trial | a* | b* | C* | A10Y | Thickness (Å) |
|---|---|---|---|---|---|
| 65CLR | −0.988 | 15.535 | 15.567 | 15.678 | 1095 |
| 100CLR | 13.588 | −17.765 | 22.366 | 8.967 | 1480 |
| 85CLR | 8.376 | 2.896 | 8.863 | 11.352 | 1306 |
| 80CLR | 4.481 | 11.34 | 12.193 | 12.892 | 1253 |
| 75CLR | 1.565 | 15.019 | 15.101 | 14.275 | 1194 |
| 70CLR | −0.276 | 15.654 | 15.656 | 15.259 | 1135 |

Materials used for transparent second surface conductive electrodes are typically materials with an approximately 1.9 index of refraction, or greater. It is known to minimize color impact of these conductive electrode materials by using half wave thickness multiples, using the thinnest layer possible for the application or by the use of one of several "non-iridescent glass structures." Non-iridescent structures will typically use either a high and low index layer under the high index conductive coating (see, for example, U.S. Pat. Nos. 4,377,613 and 4,419,386 by Roy Gordon), or an intermediate index layer (see U.S. Pat. No. 4,308,316 by Roy Gordon) or graded index layer (see U.S. Pat. No. 4,440,822 by Roy Gordon) to minimize color impact. The intensity of the ring with a color suppression layer is lower than the center of the part. The color suppression layer helps the color of the ring but the ring would still be visible because of the intensity contrast. The color suppressed ITO would therefore benefit from the use of a different sequence of metal layers on top of the ITO. Table 3a shows the color for a range of different metal options. The top chrome layer is optional, it does not contribute to the color or reflectance match of the ring. The top chrome layer is added to minimize the transmittance of the layer stack and to minimize the amount of UV light that would reach the seal, thus, extending the lifetime of the product. A chrome/rhodium/ruthenium stack is shown but it is understood that other metals, alloys, high reflectors described elsewhere in this document can be used.

The results of varying the thickness of the ITO with and without a color suppression layer are shown in Table 3a2. The colors shown in the table represent the changes which occur with an ITO thickness between 100 and 300 nm. Therefore, the use of a color suppression layer allows a broader thickness range for the ITO layer without causing the strong color variations experienced without the color suppression layer.

TABLE 3a

Effect of metal layers with color suppressed ITO - Reflectance in CIE-D65

| | Example 1 | Example 2 | Example 3 | Example 4 | Example 5 | Example 6 | Example 7 | Example 8 | Example 9 | Example 10 | Example 11 |
|---|---|---|---|---|---|---|---|---|---|---|---|
| Color Suppression Layer | 80 | 80 | 80 | 80 | 80 | 80 | 80 | 80 | 80 | 80 | 80 |
| ITO ½ Wave | 148.7 | 148.7 | 148.7 | 148.7 | 148.7 | 148.7 | 148.7 | 148.7 | 148.7 | 148.7 | 148.7 |

TABLE 3a-continued

Effect of metal layers with color suppressed ITO - Reflectance in CIE-D65

|  | Example 1 | Example 2 | Example 3 | Example 4 | Example 5 | Example 6 | Example 7 | Example 8 | Example 9 | Example 10 | Example 11 |
|---|---|---|---|---|---|---|---|---|---|---|---|
| Chrome Layer | 0 | 3 | 5 | 5 | 5 | 5 | 5 | 4 | 3 | 2 | 60 |
| Rhodium | 0 | 0 | 0 | 3 | 6 | 9 | 12 | 12 | 12 | 12 | 0 |
| Ruthenium | 30 | 30 | 30 | 30 | 30 | 30 | 30 | 30 | 30 | 30 | 30 |
| Chrome Layer | 25 | 25 | 25 | 25 | 25 | 25 | 25 | 25 | 25 | 25 | 0 |
| Reflectance Cap Y | 48.8 | 49.2 | 49.3 | 51.1 | 52.2 | 52.9 | 53.2 | 54.3 | 55.5 | 56.8 | 45.7 |
| a* | −2.2 | −1.6 | −1.4 | −0.9 | −0.5 | −0.2 | 0.0 | 0.0 | −0.1 | −0.2 | −1.8 |
| b* | 2.1 | 0.5 | −0.3 | −0.3 | −0.3 | −0.2 | −0.2 | 0.4 | 1.0 | 1.7 | −3.3 |

TABLE 3a2

Effect of color suppressed ITO thickness on color - 200 nm ITO +/− 100 nm

| Stack | Case 1 | Case 2 | Case 3 | Case 4 | Case 5 | Case 6 | Case 7 | Case 8 |
|---|---|---|---|---|---|---|---|---|
| 1.670 | 80 | 80 | 80 | 80 | 80 | 80 | 80 | 80 |
| ITO | 100 | 130 | 150 | 180 | 210 | 240 | 270 | 300 |
| Chrome | 2 | 2 | 2 | 2 | 2 | 2 | 2 | 2 |
| Rhodium | 5 | 5 | 5 | 5 | 5 | 5 | 5 | 5 |
| Ruthenium | 30 | 30 | 30 | 30 | 30 | 30 | 30 | 30 |
| a* | 1.15 | 0.54 | −0.76 | −1.5 | 0 | 0.54 | −0.84 | −1.1 |
| b* | 0.9 | 0.14 | 1.7 | 3.22 | 0.92 | −0.16 | 2.17 | 3.1 |
| 1.670 | 0 | 0 | 0 | 0 | 0 | 0 | 0 | 0 |
| ITO | 100 | 130 | 150 | 180 | 210 | 240 | 270 | 300 |
| Chrome | 2 | 2 | 2 | 2 | 2 | 2 | 2 | 2 |
| Rhodium | 5 | 5 | 5 | 5 | 5 | 5 | 5 | 5 |
| Ruthenium | 30 | 30 | 30 | 30 | 30 | 30 | 30 | 30 |
| a* | −1 | −3.9 | −3.4 | 5.5 | 8 | −4 | −10.1 | −0.9 |
| b* | −5.4 | 3.19 | 9.9 | 3.8 | −8.6 | −4.3 | 7.6 | 5.5 |

A partially transmissive layer such as thin chrome adjacent to the glass may be used to provide adhesion benefits compared to metals that might be used for better reflectivity compared to chrome such as a platinum group metal (PGM) (i.e. iridium, osmium, palladium, platinum, rhodium, and ruthenium), Silver, Aluminum and various alloys of such metals with each other, such as silver-gold, white gold, or other metals. When these other metals or alloys are placed behind the partially transmissive adhesion promoting layer, some of the improved reflectance of the second material will be realized. It may also be beneficial to overcoat the spectral filter material with a material that improves the durability of the spectral filter material whether it is in contact with a transparent conductor overcoat or if it is in direct contact with the electro-optic medium. It should be understood that the reflector may be a dichroic stack. The spectral filter material may comprise a single material such as chrome or may comprise a stack of materials such as: 1) chrome, rhodium, ITO; 2) moly; 3) chrome, rhodium, TCO; 4) chrome, platinum group metal, ITO; 5) ITO, silver, ITO; 6) ITO, silver alloy, ITO; 7) Z.sub.NO, silver/silver alloy, Z.sub. NO; 8) transparent conductor, metal reflector, transparent conductor; silicon, ITO 9) silicon, Z.sub.NO, 10) chrome, ruthenium, ITO and 11) chrome/rhodium/ruthenium/ITO or other metals, metal alloys or combinations described elsewhere in this document can be used.

There may also be advantages to applying the transparent conductive oxide(s) on the second surface of the mirror in more than one step. For example a Zinc oxide layer may be deposited initially to form a layer to which silver or its alloys bond well. This is preferably chosen at a thickness that produced a desirable color and reflectivity when combined with silver, silver alloy or other metals and their alloys. Then the metal layer(s) are applied around the perimeter of the part followed by additional transparent conductive oxide(s) over at least the electrochromic area. The additional applications of oxides improve the conductivity in the electrochromic area and may be chosen at a thickness, which yields a desirable range of hue when going from bright state to dark state, in the electrochromic area, but particularly in the fully darkened state. If the conductive oxide adjacent to the electrochromic medium has sufficient conductivity, not all of the metal oxides in the stack would necessarily need to be conductive.

For example, using an optical model, opaque silver deposited over 100 nm of ITO, the color of a reflective ring would be about, using D65 illuminant, 2 degree observer a*=−1, b*=−2 and Y value of 89. For purposes of this discussion, the silver is masked such that it is only applied in a ring around the electrochromic area. The color of the electrochromic area with only the 100 nm ITO on glass using a material of index 1.43 as the electrochromic medium and no reflection from a third or fourth surface models as a*=−3, b*=8 with a Y value of 8. To make the electrochromic area less yellow and more conductive 40 nm of ITO coating may be added in the electrochromic area. This brings the coating in the electrochromic area to about half wave optical thickness, which is approximately the second surface coating thickness that most electrochromic elements have. The model for the electrochromic area then yields a color of a*=11, b*=−14, and Y value of 5. Either, or both, of these applications of transparent conductive oxides may be of another material such as aluminum doped zinc oxide. There might also be additional layer(s) such as nickel chromium or nickel chromium suboxide, niobium or niobium suboxide, titanium or titanium suboxide, as well as, other means known in the art, that would protect or preserve a metal layer such as silver during subsequent steps of the coating and assembly process such as thermal processing steps.

Note that by using such a stack, the reflective ring will more closely match the brightness of electrochromic areas in the undarkened state that are more highly reflective such as devices that have third surface coatings incorporating silver or silver alloys.

In particular, Aluminum in direct contact with the electro-optic medium tends to degrade upon being subjected to multiple coloring/clearing cycles. An overcoat of chrome has been demonstrated to improve that durability. When an ITO overcoat is used, a material such as silicon may improve the strength of the bond between the ITO and the substances closer to the glass. Other materials, such as a platinum group metal (PGM) (i.e. iridium, osmium, palladium, platinum, rhodium, and ruthenium), may be overcoated to improve adhesion reflection conduction electrode stability, any one thereof, subcombinations thereof or combinations thereof, characteristics.

As revealed in the above figures and tables, the thickness of ITO may be chosen to produce a desired reflection color. If the ITO coating is about 25% thinner, that is about 120 Ang. Instead of 140 Ang. then a more bluish hue results (i.e. lower b*). This, however, will also result in decreased conductivity of the ITO coating. The reflectivity of the coating will also be slightly, to somewhat, higher than for coatings of the traditional half wave optical thickness where the reference is to a minimum reflectivity near 550 nm.

The compromise between optimal color and sheet resistance of the ITO may be mitigated by the use of partial deletion of the ITO layer. For instance, the ITO may be applied to any thickness needed to give adequate color in the center of the viewing area and the required sheet resistance. Then the ring portion of the ITO coating may be ion etched or removed in any other viable method so that the final thickness of the ITO in the ring is at a point where we have the desired aesthetics. The etching or removal process for the ITO may be conducted in the same process as the deposition of the subsequent metal layers or it may be done in a separate step.

It is known in the art that a chrome layer may be applied beneath the ITO layer to provide a marginal match between the viewing area and the ring. The degree of match between the ring in this case and the viewing area is a function of the reflectance in the viewing area and properties of the chrome. What has not been taught in the art is how the properties of the chrome layer affect the match of the ring to the viewing area. For instance, in some cases, the reflectance of the viewing area may be specified by law to be greater than 55%. The reflectance of the chrome ring is a function of the thickness of the chrome and, more importantly, the refractive index of the chrome. For a given refractive index dispersion formula the reflectance can be dropped from its maximum value by reducing the thickness of the chrome layer. This can have a detrimental effect because the transmittance of the chrome layer will increase thus allowing more UV light to penetrate to the EC unit seal. The UV light can damage the seal leading to a shorter lifetime of the product.

The reflectance of the ring may be enhanced by tuning the optical properties of the chrome layer. Table 3b shows the dependence of the reflectance of chrome under ITO on the optical properties of the chrome layer. Two sets of optical constants were obtained from the open literature and were mixed in different proportions to assess the effect of the optical constants on the reflectivity. The optical constants vary with wavelength and the values in Table 3b are values at 550 nm for reference. The thickness of the chrome layer is 80 nm and the ITO is 148.7 nm. In at least one embodiment, the glass thickness is 1.2 mm and the reflectance quoted is for viewing through the glass to the coating stack.

The reflectance, in this example, varies from a low of 48.6 to a high of 54.2%. This clearly demonstrates that some chrome layers may not necessarily attain the reflectance needed for a match to the reflectance in the viewing when relatively high reflectance is present in the viewing area. In addition, there is a finite maximum reflectance attainable by a single layer of chrome under the ITO. The preferred chrome layers are defined by the refractive indices of the chrome layer.

TABLE 3b

Performance of the chrome layer under ITO versus chrome for various chrome optical constants

| | Chrome Layer | | | | | |
|---|---|---|---|---|---|---|
| | 80 | 80 | 80 | 80 | 80 | (nm) |
| Chrome n | 3.456 | 3.366 | 3.279 | 3.196 | 3.116 | @550 nm |
| Chrome k | 3.981 | 4.089 | 4.199 | 4.310 | 4.423 | @550 nm |
| ITO-B18 | 148.7 | 148.7 | 148.7 | 148.7 | 148.7 | (nm) |
| Reflectance | 48.6 | 49.9 | 51.3 | 52.8 | 54.2 | (%) |

In order to define the appropriate optical constants for the chrome layer a series of calculations were performed. A simplified analysis was conducted where the refractive index of the chrome is held constant over the visible region. The analysis shows the relationship between the real and imaginary refractive indices of the chrome and the resultant reflectance. In actual practice this may varied from theoretical analysis by up to +/−20% to the effects of the dispersion in the Chrome optical constants. Table 3C shows the reflectance for various combinations of n and k and the ratio of n/k.

TABLE 3c

Reflectance for chrome under ITO as a function of the optical constants of the chrome @550 nm

| Example | n | k | ratio | Reflectance |
|---|---|---|---|---|
| 1 | 3.00 | 3.90 | 0.77 | 49.8 |
| 2 | 3.00 | 4.10 | 0.73 | 51.7 |
| 3 | 3.00 | 4.20 | 0.72 | 52.7 |
| 4 | 3.00 | 4.20 | 0.71 | 52.7 |
| 5 | 3.00 | 4.30 | 0.70 | 53.7 |
| 6 | 3.00 | 4.50 | 0.67 | 55.5 |
| 7 | 2.70 | 4.20 | 0.64 | 54.2 |
| 8 | 2.90 | 4.20 | 0.69 | 53.1 |
| 9 | 3.00 | 4.20 | 0.71 | 52.7 |
| 10 | 3.00 | 4.20 | 0.72 | 52.7 |
| 11 | 3.10 | 4.20 | 0.74 | 52.2 |
| 12 | 3.50 | 4.20 | 0.83 | 50.9 |
| 13 | 3.70 | 4.20 | 0.88 | 50.4 |
| 14 | 3.90 | 4.20 | 0.93 | 50.1 |
| 15 | 4.10 | 4.20 | 0.98 | 49.8 |
| 16 | 3.30 | 4.20 | 0.79 | 51.5 |
| 17 | 3.30 | 3.90 | 0.85 | 48.7 |
| 18 | 2.70 | 3.50 | 0.77 | 46.8 |
| 19 | 2.70 | 3.70 | 0.73 | 49.0 |
| 20 | 2.70 | 3.90 | 0.69 | 51.2 |
| 21 | 2.70 | 4.10 | 0.66 | 53.2 |
| 22 | 2.70 | 4.30 | 0.63 | 55.2 |
| 23 | 2.70 | 4.50 | 0.60 | 57.2 |
| 24 | 3.30 | 4.04 | 0.82 | 50.0 |

An analysis of this data set was conducted to determine an equation relating n and k to reflectance. Again the reflectance is calculated when viewed through the glass. Reflectance $= 9.21972 - 8.39545 \cdot n + 20.3495 \cdot k + 1.76122 \cdot n^2 - 0.711437 \cdot k^2 - 1.59563 \cdot n \cdot k$ The results can also be shown graphically. Usually shown graphically. Using the equation and/or graph we can determine the needed n and k values necessary to attain a desired degree of reflectivity for a chrome layer.

Aesthetically, it is desirable for the ring to match the viewing area as closely as possible. The eye is then not drawn to the ring and can better focus on the object in the viewing area. It is somewhat subjective what difference in appearance between the ring and viewing area is objectionable. The intensity between the ring and viewing area is preferable within 10%, more preferably within 6% and most preferably within 3%. Similarly, the color of the ring may be objectionable. The color difference between the ring and viewing area should be less than 30, preferably less than 15 and most preferably less than 10 C* units.

There may be situations where, due to processing limitation or restrictions, it is not possible to attain the desired chrome optical constants but a match is still desired between the ring and the viewing area. In other situations it may be desirable to attain a reflectance for the ring which is higher than what is possible with chrome alone. In these circumstances an approach similar to what was discussed above for the case of the metals on top of the chrome may be applied. To attain higher reflectance a relatively thin layer of chrome is applied to the glass followed by a higher reflecting metal layer such as rhodium, ruthenium, iridium, cadmium, palladium, platinum or other appropriate metal or alloy which has an inherent higher reflectance than chrome.

Table 3d shows the effect of chrome thickness on the reflectance for a fixed n and k value for the chrome layer. The optical constants for the chrome were selected to produce a reflectance less than 50% with the goal to match a viewing area reflectance of 56%. The reflectance varies with the thickness of the first chrome layer with, essentially, a perfect match when the chrome layer thickness is reduced to 2.5 nm.

TABLE 3d

Chrome thickness effect on reflectance
Modified stack to compensate for change in chrome properties
Chrome optical constants n 3.456 k 3.981

| Chrome Layer | 40 | 30 | 20 | 10 | 5 | 2.5 | (nm) |
|---|---|---|---|---|---|---|---|
| Ruthenium | 35 | 35 | 35 | 35 | 35 | 35 | (nm) |
| Chrome Layer | 0 | 10 | 20 | 30 | 35 | 37.5 | (nm) |
| ITO-B18 | 148.7 | 148.7 | 148.7 | 148.7 | 148.7 | 148.7 | (nm) |
| Reflectance | 48.4 | 48.5 | 49.7 | 52.8 | 54.9 | 55.8 | (%) |

The optical constants of the chrome layer also have an effect on the reflectance of this stack. The reflectance may be attenuated significantly with the optical constants of the chrome but with the use of a thin chrome layer backed by a higher reflectance metal layer, ruthenium in this case, the reflectance may be significantly increased compared to the case where the high reflectance metal is not present. Table 3e shows the effect of optical constants of the chrome on the reflectance.

TABLE 3e

Effect of Chrome optical constants on reflectance
Effect of Chrome base layer optical constants on reflectance

| Chrome Layer | 10 | 10 | 10 | 10 |
|---|---|---|---|---|
| Ruthenium | 35 | 35 | 35 | 35 |
| Chrome Layer | 30 | 30 | 30 | 30 |
| ITO-B18 | 148.7 | 148.7 | 148.7 | 148.7 |

TABLE 3e-continued

Effect of Chrome optical constants on reflectance
Effect of Chrome base layer optical constants on reflectance

| Reflectance | 53.5 | 54.9 | 55.9 | 56.9 |
|---|---|---|---|---|
| Chrome n | 3.366 | 3.279 | 3.196 | 3.116 |
| Chrome k | 4.089 | 4.199 | 4.310 | 4.423 |

Another option for enhancing the reflectance of the ring and improving the aesthetic match to the viewing area consists of putting a low index material between the ITO and the metal layers. The low index layer may be silica, alumina, MgO, polymer or other suitable low index material. At least options for the low index material exist. A first is to control the thickness of the silica layer to provide an interferential increase in reflectance. Table 3f compares the color of the ring with and without the addition of the low index layer. In this case, the low index layer is silica but as mentioned above any appropriate low index material is suitable for this application. The thickness of the ITO and low index layers may be adjusted to alter the color while simultaneously increasing the reflectance. The reflectance may be further increased by combining this technique with the different metal stacks described elsewhere in this document.

TABLE 3f

Effect of addition of low index layer between the ITO and metal layers

|  | Case 1 | Case 2 |
|---|---|---|
| ITO | 125 | 125 |
| SIO2 | 0 | 55 |
| Chrome | 60 | 60 |
| R | 46.6 | 54.2 |
| a* | −6.6 | −0.5 |
| b* | 0.9 | 3.0 |

Another option is to insert a relatively thick low index material between the ITO and the metal reflectors of the ring. In this case it is desirable that the low index layer to be thick enough to act as a bulk layer. The necessary thickness is dependent, at least in part, on the material properties of the bulk layer, particularly if the in-homogeneities help to eliminate the phase information of the light. The thickness of the layer may be as thin as ¼ micron or thicker to get the desired effect.

Other options to provide a match between the ring and the viewing area include the use of a High/Low/High dielectric stack. A series of dielectric layers with alternating refractive indices may be used to provide a high reflectance coating. For example, TiO2/SiO2/TiO2 alternating layers may be used. Table 3g shows a stack consisting of TiO2, SiO2 and ITO (thicknesses in nm) which provides a reflectance of the ring of 60.5% with a neutral color. The color and reflectance may be modified by adjusting the thickness of the layers. A second option, with ITO as the base layer, is also shown in Table 3g. The stack may be adjusted with both configurations to give both the desired color and reflectance values. The thickness of the ITO may be adjusted to provide for a more conductive layer. The thickness and indices of the other layers may be adjusted to compensate for the changes in the ITO thickness. This increases the utility of this design option.

TABLE 3g

High/Low/High stack for ring match

| Glass 1.6 mm | | Glass 1.6 mm | |
|---|---|---|---|
| TIO2 | 55.3 | ITO | 148.7 |
| SIO2 | 94.5 | SIO2 | 90 |
| TIO2 | 55.3 | TIO2 | 50 |
| SIO2 | 94.5 | SIO2 | 90 |
| ITO | 148.7 | TIO2 | 55 |
| Reflectance | 60.5 | Reflectance | 60.7 |
| a* | −5.3 | a* | −4.9 |
| b* | 5.64 | b* | −1.9 |

Another option for the ring is the use of an IMI, or insulator/metal/insulator, stack for the electrode. Some particular IMI stacks and ring materials are noted below but other versions are also viable. In the context of this invention, it may be assumed that an IMI stack may be substituted for ITO or another TCO. A metal or dielectric stack is then put between the IMI stack and the substrate or the seal material. Both scenarios will work well. When the reflecting stack is put between the IMI and the glass, a more flexible situation for the IMI stack is achieved, particularly, if the metal reflectors are essentially opaque. The IMI is shielded by the metal reflectors and may be adjusted as needed for the center viewing area. When the IMI is in between the glass and the reflecting stack, it is desirable to ensure that the requirements in the viewing area and ring are compatible. This may be accomplished but it does impose limitations on the IMI stack which are not present when the reflectors are between the IMI and the glass.

In the IMI stack the insulator may be a dielectric layer such as TiO2, SiO2, ZnO, SnO2, Niobium oxide, silicon metal, ZrOx, SiN or other suitable material. Mixed oxides, oxynitrides or other composites may be used. The metal is preferably Ag or an alloy of Ag. The Ag may be alloyed or doped with Au, Pd, Pt, Si, Ti, Cu or other materials selected to provide the proper electrochemical, chemical or physical properties. Protective layers may be placed between the metal layer and the dielectrics to improve adhesion, chemical stability of the metal or thermal stability of the IMI coating during heat treatment. Multiple different dielectrics may be used to attenuate color and reflectance in the viewing area and in the ring.

cussion above also exhibited relatively low levels of haze when overcoated with chrome as depicted in Table 2.

The difference between coatings may be measured by using the specular excluded option available on some reflectance spectrophotometers. It is important to check that such measurements are actually measuring scattered light and not primarily small amounts of the specular component. In general, shorter wavelengths of light scatter more readily. That fact is a good indicator when used to determine whether a given reading is actually the expected scattered light intensity being measured. A MacBeth Color Eye 7000 is one spectrophotometer that gives good haze measurement results in this regard.

As used herein, the terms "haziness" and "haze" should be understood to refer to the property of scattering, or non-specular reflection, in thin films. Haziness may be caused by a number of factors, including, less than fully oxidized layers, crystal sizes within a layer, surface roughness, layer interface properties, quality of cleaning of the substrate, subcombinations thereof and combinations thereof.

These properties may vary due to processing conditions and/or the materials. This is especially true with processing conditions, in that the level of haze may vary substantially even within a single process "batch" or "load" of coatings. Nonetheless, for an ITO layer overcoated with chrome and viewed through the glass, whether with or without color suppression or anti-iridescent underlayers, it has been shown to be possible to produce coatings much less hazy than those similarly obtained with Tec 15 glass from Libbey Owens Ford.

Aluminum oxide may be used as an underlayer to assist in controlling the hue of the spectral filter material stack, as well as, mixtures of oxides yielding an appropriate refractive index. It may be particularly advantageous to use a mixture of ITO and SiO2 and, or, SiO as an underlayer for ITO to control the resulting hue of the spectral filter material stack. The use of ceramic targets for ITO is often considered capable of tighter process control for properties such as film thickness. A sputter target comprising ITO and Si and, or, Si in a mixture of oxidation states may be employed. Such an underlayer potentially enables one to use an in line coating system that does not have substantial gas flow isolation from either pump-

TABLE 3h

IMI stacks and ring reflectance. Thicknesses are in nm unless noted

| Glass | 1.6 mm | Glass | 1.6 mm | Glass | 1.6 mm | Glass | 1.6 mm | Glass | 1.6 mm | Glass | 1.6 mm |
|---|---|---|---|---|---|---|---|---|---|---|---|
| Cr | 45.0 | Cr | 30.0 | Cr | 20.0 | Cr | 0.0 | Cr | 0.0 | Cr | 40.0 |
| ZnO | 39.8 | ZnO | 39.8 | Ru | 15.0 | Ru | 0.0 | Ru | 0.0 | Ru | 0.0 |
| Ag | 9.0 | Ag | 9.0 | ZnO | 39.8 | ZnO | 39.8 | TiO2 | 23.5 | TiO2 | 23.5 |
| ITO | 52.8 | ITO | 52.8 | Ag | 9.0 | Ag | 9.0 | ZnO | 10.5 | ZnO | 10.5 |
| Cr | 0.0 | Cr | 0.0 | ITO | 52.8 | ITO | 52.8 | Ag | 9.0 | Ag | 9.0 |
| R | 54.2 | R | 53.2 | Cr | 0.0 | Cr | 10.0 | ITO | 35.7 | ITO | 35.7 |
| a* | −4.9 | a* | −5.6 | R | 55.9 | AL | 40.0 | Ru | 0.0 | Ru | 0.0 |
| b* | 0.5 | b* | 1.3 | a* | −4.3 | R | 57.5 | Cr | 25.0 | Cr | 0.0 |
| | | | | b* | 0.9 | a* | −1.5 | R | 54.3 | R | 55.1 |
| | | | | | | b* | 8.4 | a* | −3.4 | a* | −5.0 |
| | | | | | | | | b* | −0.2 | b* | 0.8 |

When the ITO thickness is increased from a ½ wave to the point where a bluish color is achieved for the ITO plus chrome stack, the color is much more susceptible to shifts due to thickness variations during deposition and, or, due to viewing angle differences in actual use. ITO coatings deposited intentionally thinner than ½ wave optical thickness, per the dising or intervening doors, between the cathodes used for depositing the underlayer and the ITO layer. A mixture of ITO and SiO2 to at least some percentage of SiO2 will retain sufficient conductivity such that RF sputtering is not necessary. Radio Frequency (RF) sputtering compared to Medium Frequency (MF) sputtering, direct current (DC) sputtering, often requires electrical isolation and impedance matching that is not trivial to include in a thin film coating system.

Since there are regulatory requirements for 35% (40% in many European Countries) reflectivity for vehicular rearview mirrors, (clear state for electro-optic mirror elements), in order for the perimeter area to be included in the field of view calculations it needs to have such a level of reflectance. In the data provided herein with respect to chrome over Tec 15 glass, this minimum is not met.

Use of a measurably hazy CVD deposited fluorine doped tin oxide that is part of an anti iridescent structure for use in electro-optic devices is known. Various thicknesses of ITO are known for providing a conductive electrode. It has not previously been known that the b* of an indium-tin-oxide conductive electrode and chrome spectral filter material stack may be predictably controlled by varying the thickness of the ITO. Pyrolitically deposited Fluorine doped tin oxide with an anti iridescent structure (Tec 15 from L.O.F) is substantially more hazy when overcoated with chrome compared with ITO deposited over a layer of aluminum oxide as shown in Table 1.

In embodiments where the spectral filter material is located proximate the first surface it can be advantageous to minimize the distance between the first surface and the third or fourth surface reflector. The greater the distance between the reflector and the first surface, the greater the discontinuity will be in the image reflected by the element when transitioning from the main reflector to the spectral filter material. This will be accentuated as the viewing angle increases.

In embodiments where a spectral filter material is located proximate the second surface of the element and an additional coating, such as a hydrophilic coating, is on the first surface, the optical properties of both coatings will affect the appearance of the perimeter of the device and may require adjustments to the layers for optimal appearance of the perimeter. In the case of an electro-optic element with a hydrophilic coating as described in commonly assigned U.S. Pat. Nos. 6,447,123, 6,193,378 and application Ser. No. 09/602,919 hereby incorporated in their entireties by reference, the first surface coating will have a reflectance substantially lower than the reflectance of the preferred embodiments of a second surface spectral filter material as described herein. This will result in the hue and, or, chroma of the color of the perimeter of the device being more dependent on the second surface coatings than those on the first surface. Nonetheless, especially when color is chosen near a point of transition from perceived yellowish to bluish, +b* to −b*, respectively, or reddish to greenish, +a* to −a*, respectively, these differences tend to become more perceivable. When attempting to match the hue of the spectral filter material to that of the overall field of view of the reflector, small differences in the materials that result in transitions from more yellow to less yellow, or less blue to more blue, when compared to the overall field of view of the element may be avoided by practicing the teachings herein. A similar contrast in reddish or greenish hue may be managed.

For example, the color and reflectance of the ring and viewing area with and without a hydrophilic surface coating were modeled with a thin film program. The spectral filter ring consists of 126 nm of ITO, 3 nm of Cr, 5 nm of Rh, 30 nm of Ru and 40 nm of Cr. The exit medium or material next to the metals and dielectric layers is an electrochromic fluid with an index of approximately 1.365. The hydrophilic layer consists of a 65 nm color suppression layer next to the glass, a 234 nm TiO2 layer with a surface morphology and 10 nm of SiO2.

Table 4a shows the reflectance and color of various portions of the mirror. The first two rows show the effect of the presence or absence of the hydrophilic layer on the appearance of the ring. The color and reflectance are essentially unchanged with the application of the hydrophilic layer on the first surface of the mirror. In rows 3 and 4 we see the change of color in the viewing area when the mirror is in the darkened state. In the undarkened state the higher reflectance of the back reflector dominates the appearance. The reflectance increases with the hydrophilic layer which may have advantages in certain markets. The color of the viewing area without the hydrophilic layer in this case is somewhat objectionable because of the thickness of the ITO is selected to optimize the color of the ring. This results in a somewhat compromised color in the viewing area. By adding the hydrophilic coating on surface one the color becomes more neutral, a positive benefit to the combination. The fifth row shows the color of the hydrophilic layer without any other coatings on surface two of the glass and with an electrochromic fluid as the exit medium for reference.

TABLE 4a

Color and reflectance of different mirror components

| Structure | R | a* | b* |
|---|---|---|---|
| Hydro/Glass/ITO/Cr/Rh/Ru/Cr | 58.46 | −4.20 | 3.23 |
| Glass/ITO/Cr/Rh/Ru/Cr | 58.23 | −4.20 | 1.96 |
| Hydro/Glass/ITO | 13.50 | 0.69 | −3.10 |
| Glass/ITO | 5.65 | 4.69 | 1.92 |
| Hydro/Glass | 12.47 | −1.70 | −4.60 |

It is to be understood that variations and modifications can be made on the aforementioned structure without departing from the concepts of the present invention. Furthermore, it is to be understood that such concepts are intended to be covered by the following claims unless these claims by their language expressly state otherwise.

We claim:

1. An exterior rearview mirror element comprising:
a front element having a first front surface and a second rear surface, wherein a cross-section of the second rear surface defines a first line;
a rear element having a third front surface and a fourth rear surface;
electrochromic material located between the front element and the rear element;
a spotter optic in the second rear surface of the front element, wherein a cross-section of the spotter optic defines a second line;
a transition region disposed between the spotter optic and the second rear surface of the front element, wherein a distance from a surface of the transition region to an intersection of the first line and the second line is between about 0.001 mm and 0.034 mm;
at least a portion of the spotter optic having a first radius of curvature and at least a portion of the first front surface having a second radius of curvature, the first radius of curvature being smaller than the second radius of curvature;
a spectral filter material surrounding at least one-quarter of the periphery of the spotter optic, wherein the average distance from an outside edge of the spectral filter material to an outside edge of the spotter optic varies by no more than 50 percent.

2. The exterior rearview mirror element of claim 1, wherein:
the rearview mirror element has a first area not including the spotter optic and a second area including the spotter optic, the first area reflecting a first zone and the spotter optic reflecting a second zone; and the electrochromic material is configured to reduce the first zone reflectance, but not the second zone reflectance when the electrochromic material is activated.

3. The exterior rearview mirror element of claim 1, wherein:
the distance from the intersection of the first line and the second line to the transition region is between about 0.004 mm and 0.020 mm.

4. The exterior rearview mirror element of claim 1, wherein:
the distance from the intersection of the first line and the second line to the transition region is between about 0.006 mm and 0.012 mm.

5. The exterior rearview mirror element of claim 1, wherein:
the distance from the intersection of the first line and the second line to the transition region is about 0.008 mm.

6. The exterior rearview mirror element of claim 1, wherein:
the spotter optic comprises a convex reflective surface including a reflective material thereon.

7. The exterior rearview mirror element of claim 6, further comprising:
a seal abuts the front element and the rear element, the seal substantially surrounds the electrochromic material.

8. The exterior rearview mirror element of claim 7, further comprising:
reflective material on the second rear surface covering the seal to prevent observation of the seal from the first front surface; and
wherein the spotter optic comprises a convex reflective surface located at the second rear surface, the convex reflective surface further having the reflective material thereon.

9. An exterior rearview mirror element comprising:
a front element having a first front surface and a second rear surface;
a rear element having a third front surface and a fourth rear surface;
electrochromic material located between the front element and the rear element; and
a spotter optic located at the second rear surface of the front element, the spotter optic having a reflective coating;
at least a portion of the spotter optic having a first radius of curvature and at least a portion of the first front surface having a second radius of curvature, the first radius of curvature being smaller than the second radius of curvature;
wherein an electrical potential is applied across a first electrode coating on the second rear surface and a second electrode coating on the third front surface, changing an absorption of the electrochromic material in order to reduce a reflection off of the exterior rearview mirror element;
a transition region between the second rear surface of the front element and the spotter optic, wherein a cross-section of the second rear surface defines a first line, and a cross-section of the spotter optic defines a second line, and wherein a distance from the transition region to the intersection of the first line and the second line is between about 0.004 mm and 0.020 mm;
a spectral filter material surrounding at least one-quarter of the periphery of the spotter optic, wherein the average distance from an outside edge of the spectral filter material to an outside edge of the spotter optic varies by no more than 50 percent.

10. The exterior rearview mirror element of claim 9, wherein:
the rearview mirror element has a first area not including the spotter optic and a second area including the spotter optic, the first area reflecting a first zone and the spotter optic reflecting a second zone; and
the electrochromic material is configured to reduce the first zone reflectance, but not the second zone reflectance when the electrochromic material is activated.

11. The exterior rearview mirror element of claim 9, wherein:
the distance from the intersection of the first line and the second line to the transition region is between about 0.006 mm and 0.012 mm.

12. The exterior rearview mirror element of claim 9, wherein:
the distance from the intersection of the first line and the second line to the transition region is about 0.008 mm.

13. The exterior rearview mirror element of claim 9, wherein:
the spotter optic comprises a convex reflective surface having the reflective coating thereon.

14. An exterior rearview mirror element comprising:
a front element having a first front surface and a second rear surface, the second rear surface having a first electrode coating thereon;
a rear element having a third front surface and a fourth rear surface, the third front surface having a second electrode coating thereon;
electrochromic material located between the front element and the rear element;
a spotter optic located at the second rear surface of the front element, the spotter optic having a reflective coating;
a transition region disposed between the spotter optic and the second rear surface, wherein the transition region defines a first area and the spotter optic defines a second area, and wherein the first area is less than 20 percent of the second area;
wherein the first electrode coating and the reflective coating abut and overlap such that a line perpendicular to the first front surface of the front element extends through both the first electrode coating and the reflective coating;
a spectral filter material surrounding at least one-quarter of the periphery of the spotter optic, wherein the average distance from an outside edge of the spectral filter material to an outside edge of the spotter optic varies by no more than 50 percent.

15. The exterior rearview mirror element of claim 14, wherein:
the rearview mirror element has a first area not including the spotter optic and a second area including the spotter optic, the first area reflecting a first zone and the spotter optic reflecting a second zone; and
the electrochromic material is configured to reduce the first zone reflectance, but not the second zone reflectance when the electrochromic material is activated.

16. The exterior rearview mirror element of claim 14, wherein:
the first electrode coating and the reflective coating overlap at least 0.5 mm substantially around a perimeter of the spotter optic.

17. The exterior rearview mirror element of claim 14, wherein:

the spotter optic comprises a convex reflective surface having the reflective coating thereon.

\* \* \* \* \*

UNITED STATES PATENT AND TRADEMARK OFFICE
CERTIFICATE OF CORRECTION

PATENT NO. : 8,643,931 B2  Page 1 of 1
APPLICATION NO. : 13/171950
DATED : February 4, 2014
INVENTOR(S) : David J. Cammenga et al.

It is certified that error appears in the above-identified patent and that said Letters Patent is hereby corrected as shown below:

In The Specification

Col. 1, line 12;

"7,864,4001" should be --7,864,400)--;

Col. 15, line 25;

"matter For" should be --Manner. For--;

Col. 17, line 5;

"matter For" should be --manner. For--;

Col. 26, line 40;

"ofhue" should be --of hue--.

Signed and Sealed this
Third Day of February, 2015

Michelle K. Lee
*Deputy Director of the United States Patent and Trademark Office*